(12) United States Patent
Piccionelli et al.

(10) Patent No.: US 11,960,659 B2
(45) Date of Patent: Apr. 16, 2024

(54) CAKE DECORATION SYSTEM

(71) Applicants: Gregory A. Piccionelli, Westlake Village, CA (US); Gregory B. Gulliver, Grayslake, IL (US)

(72) Inventors: Gregory A. Piccionelli, Westlake Village, CA (US); Gregory B. Gulliver, Grayslake, IL (US)

(*) Notice: Subject to any disclaimer, the term of this patent is extended or adjusted under 35 U.S.C. 154(b) by 0 days.

(21) Appl. No.: 17/549,852

(22) Filed: Dec. 13, 2021

(65) Prior Publication Data
US 2022/0164039 A1 May 26, 2022

Related U.S. Application Data

(63) Continuation-in-part of application No. 16/746,131, filed on Jan. 17, 2020, now Pat. No. 11,199,913, and a continuation-in-part of application No. 16/690,087, filed on Nov. 20, 2019, now Pat. No. 11,641,860, said application No. 16/746,131 is a continuation of application No. 16/004,270, filed on Jun. 8, 2018, now Pat. No. 10,540,019, which is a continuation of application No. 15/230,133, filed on Aug. 5, 2016, now Pat. No. 9,996,170, said application No. 15/230,133 is a continuation-in-part of application No. 13/815,824, filed on Mar. 15, 2013, now Pat. No. 10,438,448, which is a continuation-in-part of application No. 13/815,763, filed on Mar. 15, 2013, now Pat. No. 9,553,963.

(60) Provisional application No. 62/769,962, filed on Nov. 20, 2018, provisional application No. 62/201,486, filed on Aug. 5, 2015, provisional application No. 62/201,170, filed on Aug. 5, 2015.

(51) Int. Cl.
G06F 3/0346 (2013.01)
G06F 3/01 (2006.01)
G06F 3/14 (2006.01)
G07F 17/32 (2006.01)
G10H 1/00 (2006.01)
H04R 27/00 (2006.01)

(52) U.S. Cl.
CPC ............ *G06F 3/0346* (2013.01); *G06F 3/014* (2013.01); *G06F 3/1423* (2013.01); *G07F 17/3272* (2013.01); *G10H 1/0008* (2013.01); *G10H 2220/326* (2013.01); *G10H 2240/211* (2013.01); *H04R 27/00* (2013.01); *H04R 2227/003* (2013.01); *H04R 2420/07* (2013.01)

(58) Field of Classification Search
CPC ...... G06F 3/0346; G06F 3/014; G06F 3/1423; G07F 17/3272; G10H 1/008
See application file for complete search history.

(56) References Cited

U.S. PATENT DOCUMENTS 7,248,230 B2 * 7/2007 Piccionelli ......... A47G 33/0809 345/2.1
2007/0154857 A1 * 7/2007 Cho ....................... C11C 5/008 431/253

* cited by examiner

*Primary Examiner* — Evan P Dzierzynski
*Assistant Examiner* — Nathaniel J Lee
(74) *Attorney, Agent, or Firm* — Gregory B. Gulliver

(57) ABSTRACT

A cake decoration that enables visual shows controlled by a controller that is either remote to the decoration or integral with the decoration and interacts with a finger controller.

19 Claims, 36 Drawing Sheets

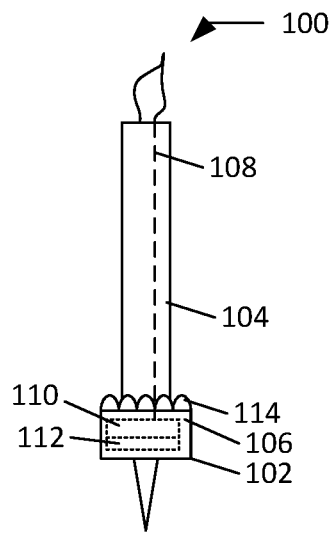
FIG. 1
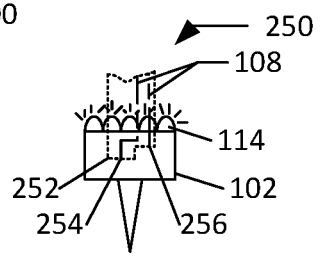
FIG. 2A  FIG. 2B
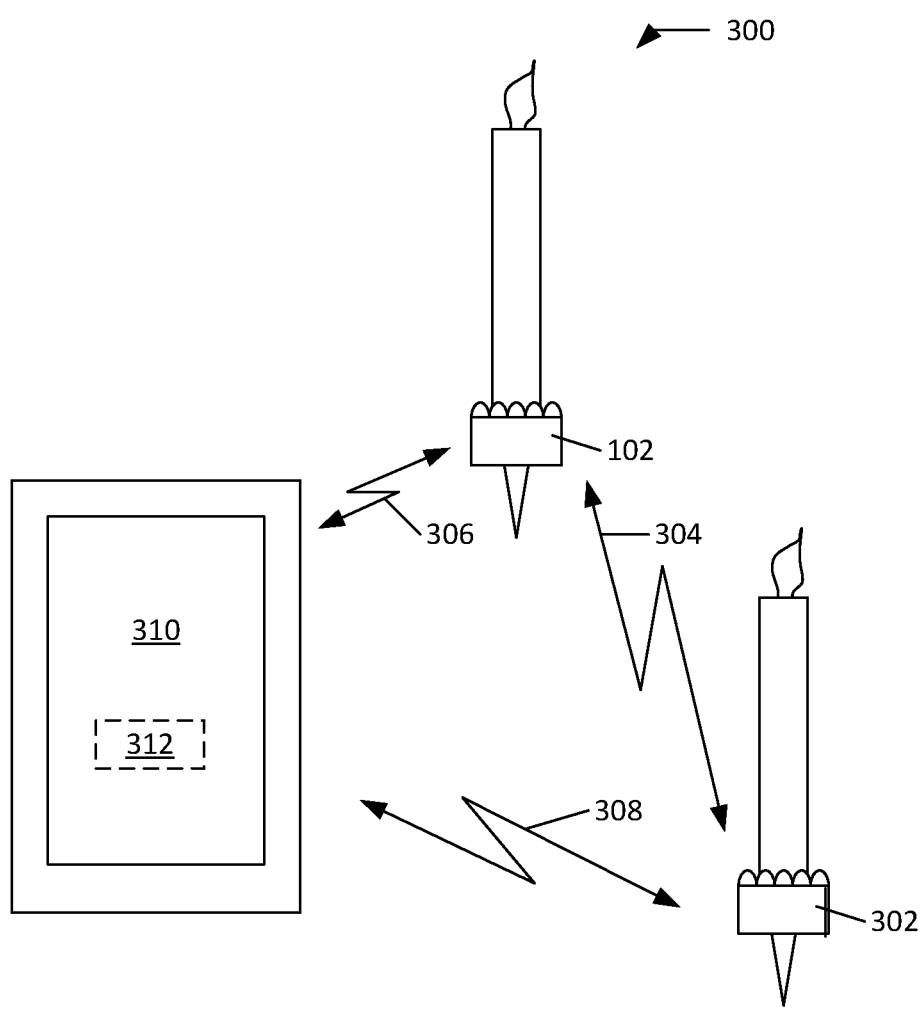
FIG. 3

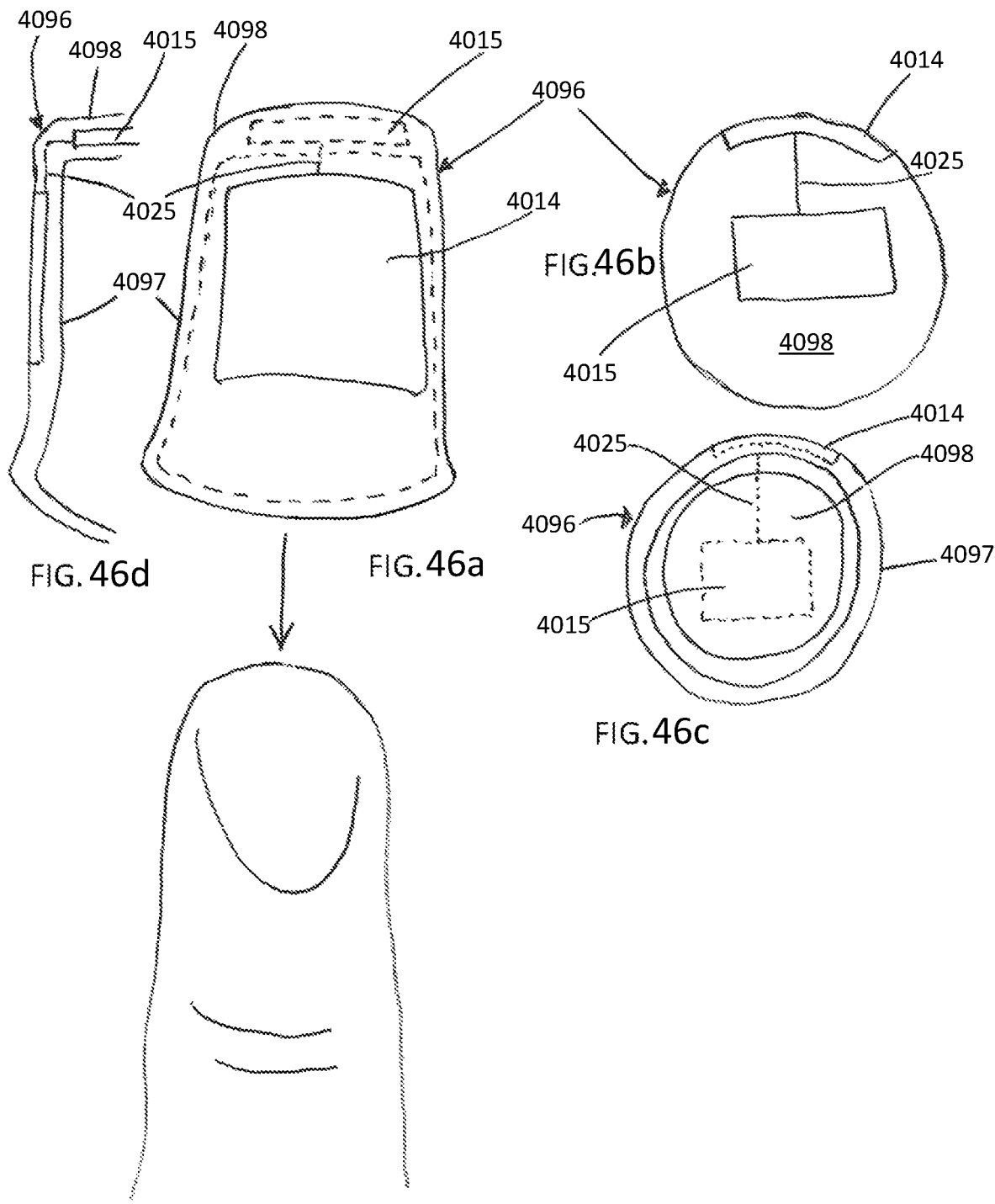

CAKE DECORATION SYSTEM

RELATED APPLICATIONS

The present application is a continuation-in-part and claims priority to U.S. application Ser. No. 16/690,087, filed on Nov. 20, 2019, titled CAKE DECORATION that claims priority to the U.S. Provisional Application No. 62/769,962, filed on Nov. 20, 2018, titled CAKE DECORATION and all are incorporated by reference fully and claim to priority made herein. This application also claims priority to U.S. application Ser. No. 16/746,131, filed on Jan. 17, 2020, titled FINGER COMPUTER DISPLAY AND CONTROLLER DEVICE that is a continuation of U.S. Pat. No. 10,540,019, filed on Jun. 8, 2018, that is a continuation of U.S. Pat. No. 9,996,170 filed on Aug. 5, 2016, that claims priority to U.S. Provisional Application 62/201,393, filed on Aug. 5, 2015 and U.S. Provisional Application 62/201,486, filed on Aug. 5, 2015, and is also a continuation-in-part of U.S. Pat. No. 9,553,963, filed on Mar. 15, 2013, and U.S. Pat. No. 10,438,448, filed on Mar. 15, 2013, all of which are incorporated by reference fully and claim to priority made herein.

TECHNICAL FIELD

The present invention relates generally to holiday decorations and more particularly to food decoration.

BACKGROUND

It is common for celebrations, such as holidays and birthdays to be celebrated with food, such as cakes. Traditionally frosting is used to decorate cakes for different occasions and writing messages. Within the last few years, printing with edible ink has been used with frosting to allow images to be placed on cakes. In addition to the frosting, candles, candleholders, and plastic devices, such as toys and images have been put on cakes. But, candles and frosting decorations are fleeting and have limited reusability. Further, the designs and types of decorations are limited.

SUMMARY

Reusable decorations for food that enable light and sound to be integrated into a display. The decorations may be controlled by a wireless device or self-contained in the decoration. Audio and visual display performances are created and executed by the decoration devices.

In some embodiments a cake decoration device ("CDD") or a plurality of CDDs that communicates and/or interacts with one or more CDDs and/or one or more external devices. Such configurations of the invention are sometimes referred to as a cake display system ("CDS").

A cake display system may interact with other devices and controllers, such as a finger display device.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 1 is a diagram of a candle holder with a candle having a control area and flame detector in accordance with an example implementation of the invention.

FIG. 2A is a diagram of the candle holder of FIG. 1 with the light-emitting elements illuminated in accordance with an example implementation.

FIG. 2B is a diagram of the candle holder of FIG. 1 with an offset candle holder well in accordance with an example implementation.

FIG. 3 is a diagram of multiple candle holders as depicted in FIG. 1 that communication between themselves and a smart device in accordance with an example implementation.

FIGS. 46a-d are illustrations of an alternative embodiment in which the embodiment of FIG. 45 is in a thimble-like finger cap.

Figure 4:
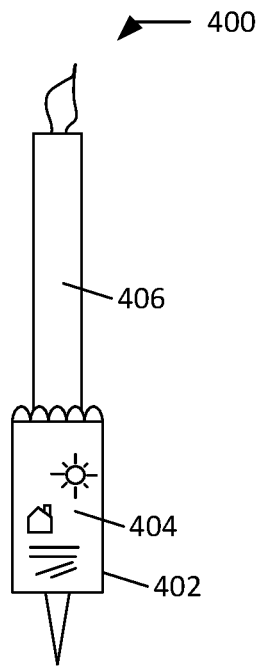
FIG. 4 is a diagram of a candle holder with a display and a candle in accordance with an example implementation of the invention.

Remaining Figures are diagrams of user interface displayed on a smart device in accordance with an example implementation.

DETAILED DESCRIPTION

A celebration decoration approach is described that is suitable for a cake that enables visual and audible display shows. A remote controller such as a smart device may control the show or an onboard controller may be configured to control the show depending upon the embodiment. In some implementations of the invention the smart device comprises a smartphone, such as an iPhone®, iPad®, Android® Phone, tablet, a computer, etc., running a suitable control program or application.

In FIG. 1, a diagram 100 of a candle holder 102 with a candle 104 having a control area 106 and flame detector 108 is depicted in accordance with an example implementation of the invention. The candle holder 102 has a controller 110, power supply 112 and light-emitting diodes (LEDs) 114. An example of a flame detector 108 is a thermocouple that runs the length of the candle 104, that when burned activates the controller 110 and results in the activation of a program, display, and/or "show" using the LEDs. In other implementations, additional devices, speakers, displays, microphones, and cameras may be controlled by the controller and part of the show.

Turning to FIG. 2A, a diagram 200 of the candle holder 102 of FIG. 1 with the light-emitting elements 114 illuminated is depicted in accordance with an example implementation. The candle 104 portion may be made of wax with the flame detector 108 inside. In other implementations, a thermocouple or other flame detector 108 may be applied to the outside of the candle. In yet other implementations, the candle may be an electric candle and have one or more devices for turning it on and off, such as a switch, sensor, receiver, transmitter, or transceiver.

Turning to FIG. 2B, a diagram 250 of the candle holder 102 of FIG. 1 with an offset candle holder well 252 is depicted in accordance with an example implementation. The bottom of the candle holder well 252 has two contact points 254 and 256 for the leads of the flame detector (thermocouple) 108. The flame detector may be implemented as a single element in the candle 104 (as shown in FIG. 2A) or multiple elements (as shown in FIG. 2B). An advantage of the offset candle holder well 252 is it aids in aligning the candle 104 in a known orientation for connections with the contact points. The connection points are depicted as pads, but in other implementations, pins, slots, springs, or other known approaches for making removable electrical contacts may be employed. In yet other implementations, the candle holder well may have a flat bottom rather than an offset.

In FIG. 3, a diagram 300 of candle holder 102 as depicted in FIG. 1 and candle holder 302 (multiple candle holders) that communicate 304, 306, and 308 between themselves 102, 302 and a smart device 310 are depicted in accordance with an example implementation. In such implementations of the invention a smart device 310 with a processor/controller 312 executing appropriate software or application (s) is in communication, (Bluetooth, wifi, infrared, etc. . . . ) with the controllers in the candle holders 102, 302 and controls the show. The candles holders 102, 302 are similar to ornaments and lights on a Christmas tree being controlled by a user interface on a smart device or at least creating a show that is downloaded by the smart device, such as smart device 310. The communication between elements of the CDS, such as candle holders and smart devices may be wireless or wired, or a combination of wired and wireless depending upon the embodiment.

Turning to FIG. 4, a diagram 400 of a candle holder 402 with a display 404 and a candle 406 is depicted in accordance with an example implementation of the invention. A bendable of flexible display 404, such as an OLED display, is wrapped around the candle holder 402 (such as a display made by FLEXENABLE LIMITED, 34 Cambridge Science Park, CB4 0FX, UK). In some implementations, the display 404 substantially comprises the body of the candle holder 402. A controller, transceiver, and the power supply are located within the candle holder 402. Depending upon the display 404 and controller, video images or still images, or a combination of video and static images may be incorporated into a show and displayed on the display 404 in some implementations.

Figure 5:
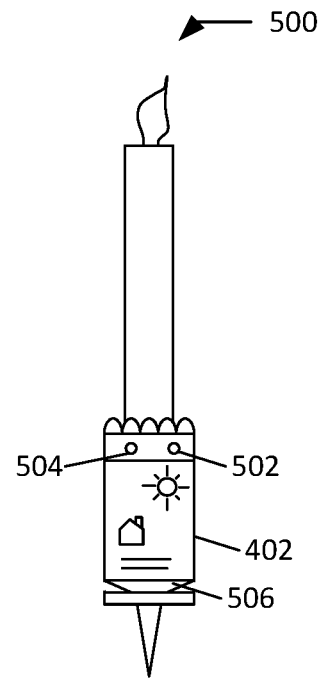
FIG. 5 is a diagram of the candle holder of FIG. 4 that has a camera, microphone, and speaker in accordance with an example implementation.

In FIG. 5 a diagram 500 of the candle holder 402 of FIG. 4 that has a camera 502, microphone 504, and a speaker 506 is depicted in accordance with an example implementation. A controller coupled to a transceiver and speaker 506 and the power supply are located within the candle holder 402. The speaker 506 may play audio that is pre-recorded and loaded into a memory located within the controller or attached to the controller, received from a smart device or other transmitters (i.e. Bluetooth, WiFi, radio, etc.). In some implementations, the audio may be from a remote location, such as from a well-wisher (i.e. grandmother in another state or country) via an application (i.e. Skype, Whatsapp, or custom application) located on a smart device at that remote location. In some implementations, content is transmitted to and received by the candle holder 402 or the CDS device via Bluetooth, WiFi, radio, etc.

Figure 6:
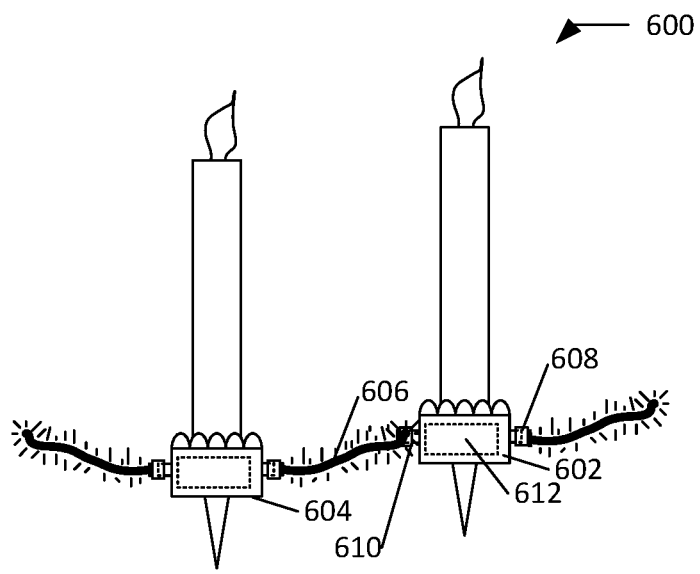
FIG. 6 is a diagram of candle holders that couple together with a bus that enables communication and emits light in accordance with an example implementation of the invention.

Turning to FIG. 6, a diagram 600 of candle holders 602, 604 that couple together with a bus 606 that enables communication and emits light is depicted in accordance with an example implementation of the invention. In other implementations, the bus 606 may not emit light. The candle holders 602 and 604 are hubs that enable a bus (with LED cords in the current implementation) to be connected and controlled. A predetermined number of termination points 608, 610 in the candle holder 602 creates the hub. The termination points supply power and communication bus connections, depending upon the implementation. The LED cords may be a single color or multiple colors depending upon the implementation. Multiple candle holders and at least one controller 612 may be coupled together by the bus and candle holder 602, 604 hubs. A serial communication protocol (such as I$^2$C) may also be used when communication between controllers and devices such as displays and candle holders depending upon the implementation. In other implementations, other types of protocols may be employed.

Figure 7:
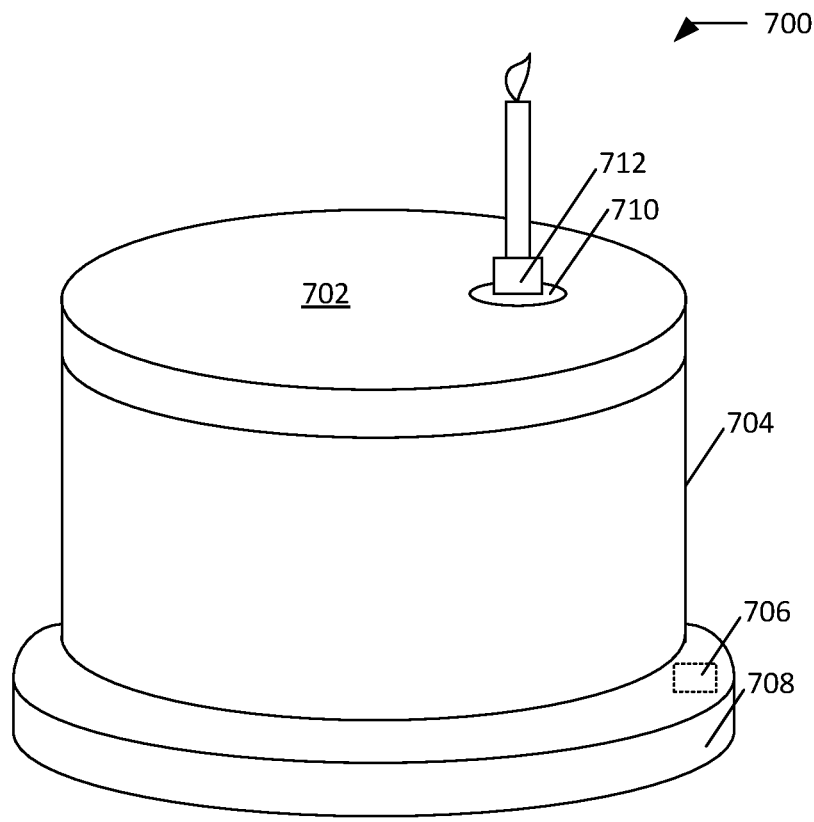
FIG. 7 is a diagram of a display resting on top of a cake with a controller and power supply located in a base in accordance with an example implementation of the invention.

In FIG. 7, a diagram 700 of a display 702 resting on top of a cake 704 with a controller 706 and power supply 708 located in a base is depicted in accordance with an example implementation of the invention. The display (LED, OLED, LCD, or similar display) 702 is located on the top of the cake. Areas of the display may be defined to hold a candle holder 710 for candle holders as previously described, such as candle holder 712. In other implementations, holes may be disposed or defined in the display to enable candles or candle holders to be placed directly into the top of the cake. In some preferred embodiments, the candles or candle holders may comprise electronic candles or display candle holders as previously described. The display 702 is connected via a wire or wirelessly, depending upon the embodiment, to the base that supports the cake 704. The base has a power supply 708 and controller 706 that control the display 702. The power supply 708 in the base may be a battery, wired, induction, or wireless power. In some embodiments, the base includes speakers or other sound generating devices that are capable of generating sound associated with the content displayed on the aforementioned display 702 on top of the cake 704 and/or on one or more of the aforementioned electronic candles.

Figure 8:
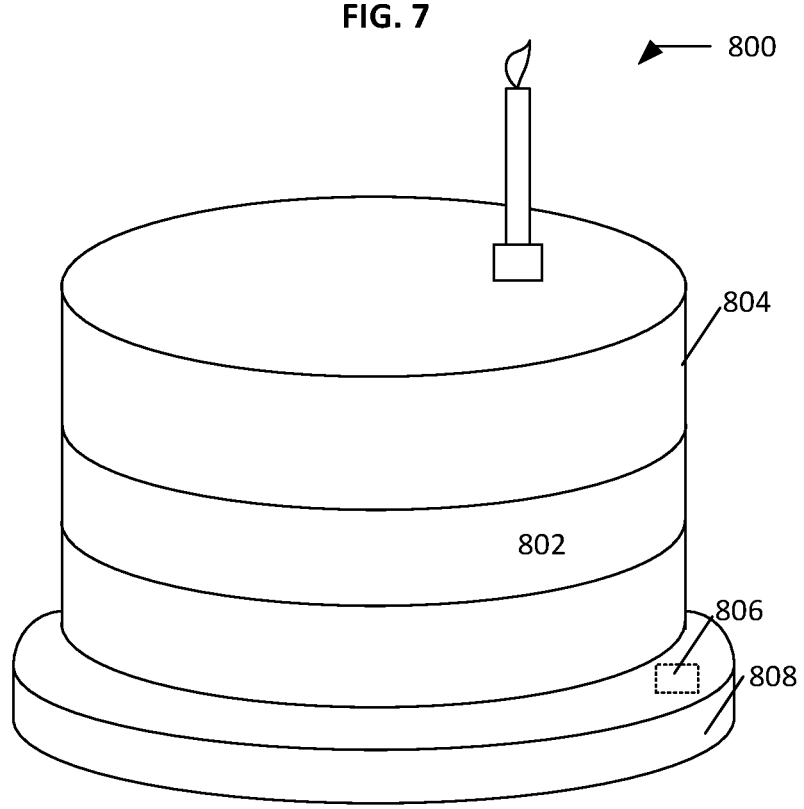
FIG. 8 is a diagram of a display around the side circumference of the cake with a power supply and controller located in a base in accordance with an example implementation of the invention.

Turning to FIG. 8, a diagram 800 of a display 802 around the side circumference of the cake 804 with a power supply 808 and controller 806 located in a base is depicted in accordance with an example implementation of the invention. The display 802 is connected via a wire or wirelessly, depending upon the embodiment, to the base that supports the cake 804. The base has a power supply 808 and controller 806 that control the display 802. The power supply 808 in the base may be a battery, wired, or wireless power. In other embodiments, a display of FIG. 7 and FIG. 8 may both be located on a cake 804. In some implementations of the invention a mechanical turntable is incorporated into the base providing a means for the cake and the CDS to rotate. In some preferred embodiments control of the turntable (start, stop, speed, coordinated play with CDS and other devices, etc.) is by a smart device running code or one or more applications to effectuate such control. In some implementations of the invention, such motion is responsive to cues in a show performed by the CDS.

Figure 9:
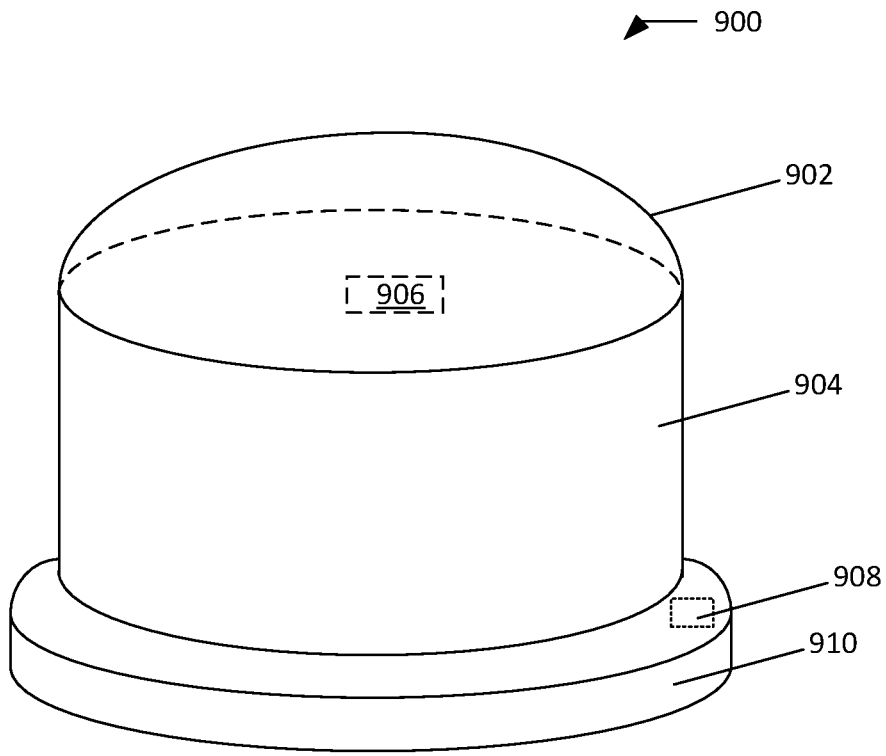
FIG. 9 is a diagram of a screen dome located on top of a cake that receives a projection from a projector with a controller and power supply located in a base in accordance with an example implementation.

FIG. 9 is a diagram 900 of a screen dome 902 located on top of a cake 904 that receives a projection from a projector 906 with a controller 908 and power supply 910 located in a base in accordance with an example implementation. The projector 906 is located under the screen dome 902 and projects an image onto it. The power supply 910 and controller 908 that are coupled to the projector 906 is located in the base. In some embodiments a plurality of projectors is located under the screen dome 902 and multiple simultaneous projections may be viewed. In some embodiments the projection comprises a holographic projection or a 3D video projection. In some embodiments of the invention, a curved or flexible screen is disposed on all or part of the dome.

In some implementations of the invention the base is configured to be a plate for a cake or other foodstuff and the dome is configured to provide a cover that fits over the plate and provides a seal to help keep a cake or other foodstuff disposed on the plate fresh in a manner similar to that used by a Plate Topper™.

Figure 10:
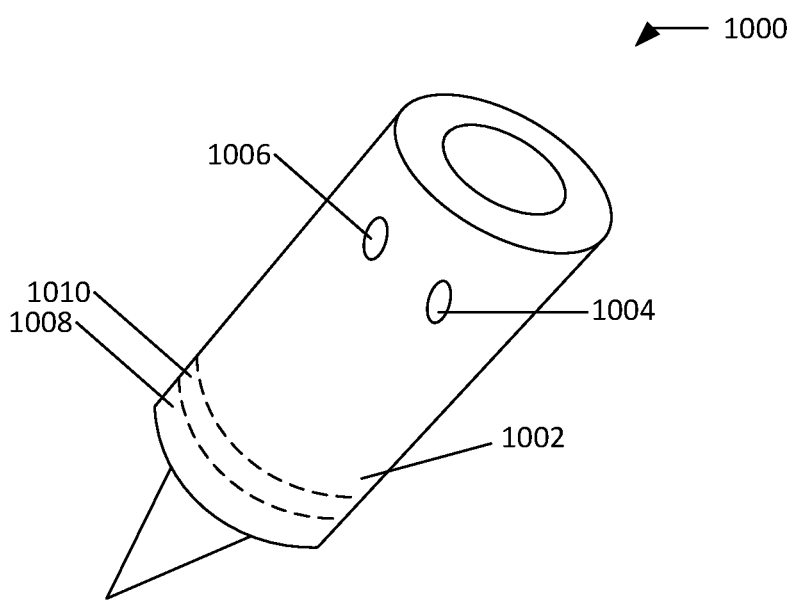
FIG. 10 is a diagram of a candle holder with a microphone and a camera in accordance with an example implementation of the invention.

Turning to FIG. 10, a diagram of a candle holder 1002 with a microphone 1004 and a camera 1006 is depicted in accordance with an example implementation of the invention. A power supply 1008 and controller 1010 may be located within the candle holder. In other implementations, a wired or wireless communication and or power connection may be made to a power supply and controller.

Figure 11:
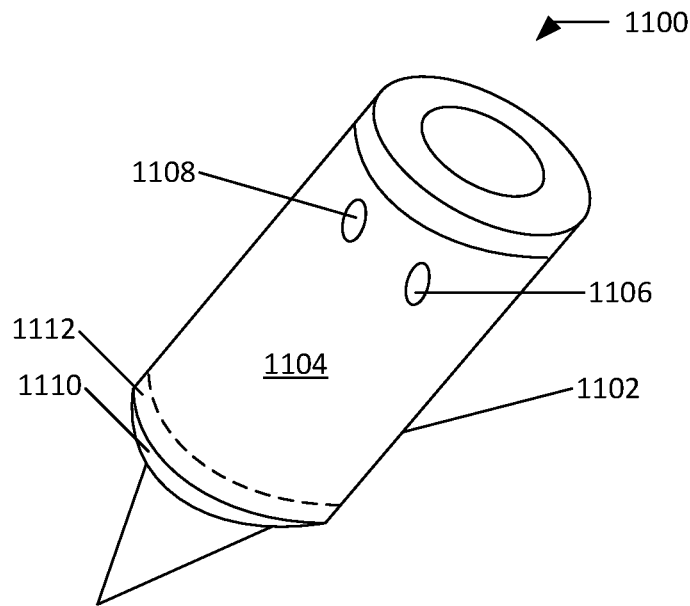
FIG. 11 is a diagram of a candle holder with a screen located around the outside circumference with a microphone and a camera in accordance with an example implementation of the invention.

In FIG. 11, a diagram 1100 of a candle holder 1102 with a screen 1104 located around the outside circumference with a microphone 1106 and a camera 1108 is depicted in accordance with an example implementation of the invention. A power supply 1110 and controller 1112 may be located within the candle holder 1102. In other implementations, a wired or wireless communication via a transceiver and or power connection may be made to a power supply 1110 and controller 1112.

Figure 12:
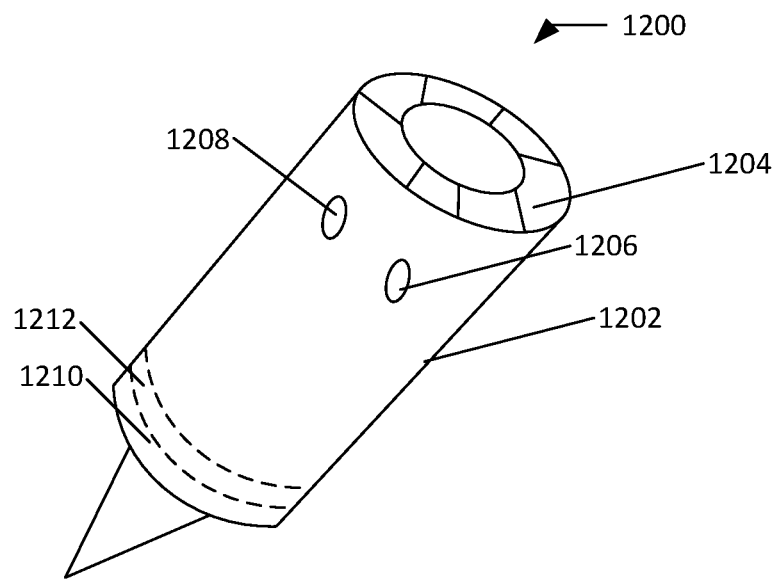
FIG. 12 is a diagram of a candle holder with a display located around the top with a microphone and a camera in accordance with an example implementation of the invention. Detailed Description

Turning to FIG. 12, a diagram 1200 of a candle holder 1202 with a display 1204 located around the top with a microphone 1206 and a camera 1208 in accordance with an example implementation of the invention. A power supply 1210 and controller 1212 may be located within the candle holder. In other implementations, a wired or wireless communication and or power connection may be made to a power supply and controller.

Figure 13:
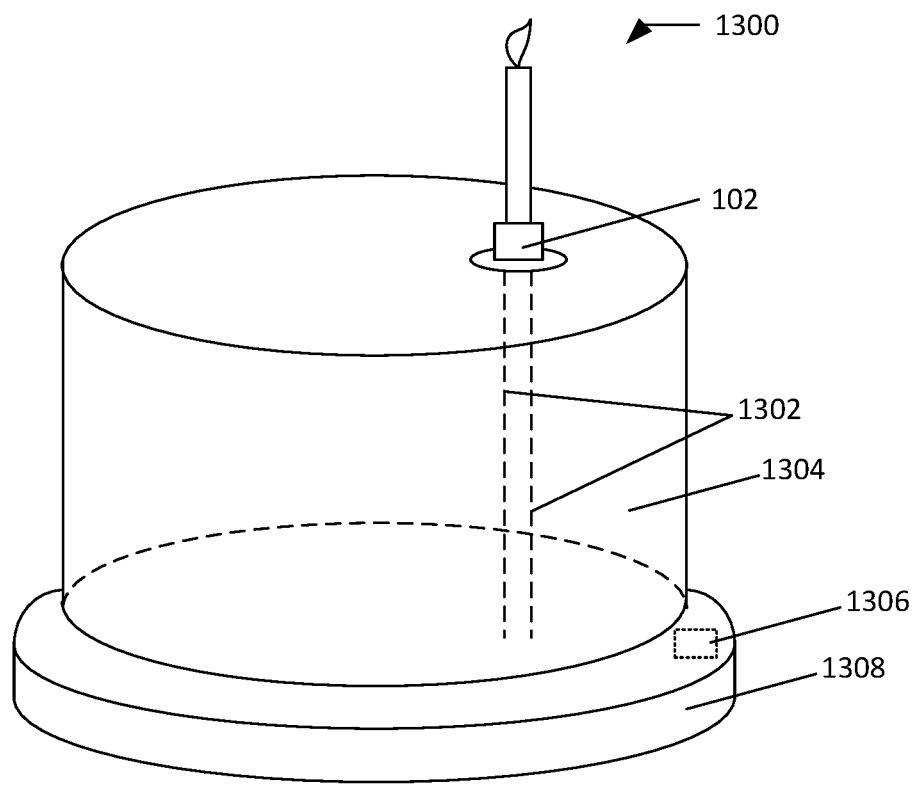
FIG. 13 is a diagram of the candle holder of FIG. 1 with wires connecting the candle through the cake to the controller and power supply located in a base in accordance with an example implementation.

In FIG. 13, a diagram 1300 of the candle holder of FIG. 102 with wires 1302 connecting the candle holder 102 through the cake 1304 to the controller 1306 and power supply 1308 located in a base in accordance with an example implementation. In the current implementation the wires 1302 act as a power and communication bus. In other implementations, the wires 1302 may only be a communication or power bus.

Figure 14:
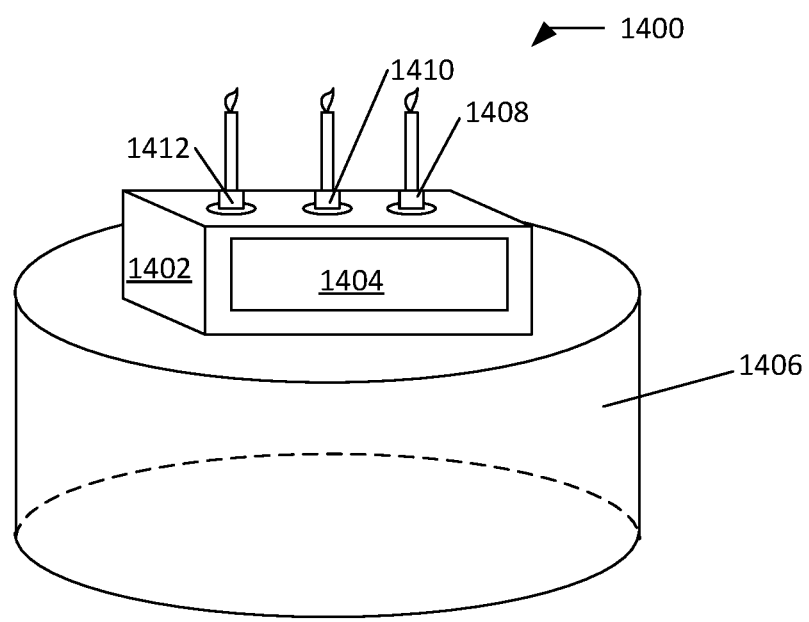
FIG. 14 is a diagram of a block candle holder with a display screen atop a cake in accordance with an example implementation.

FIG. 14 is diagram 1400 of a block candle holder 1402 with a display screen 1404 atop a cake 1406 in accordance with an example implementation. The block candle holder 1402 contains the candle holders 1408, 1410, 1412 integrated into a housing that has a power supply, display 1404, transceiver, and controller.

Figure 15:
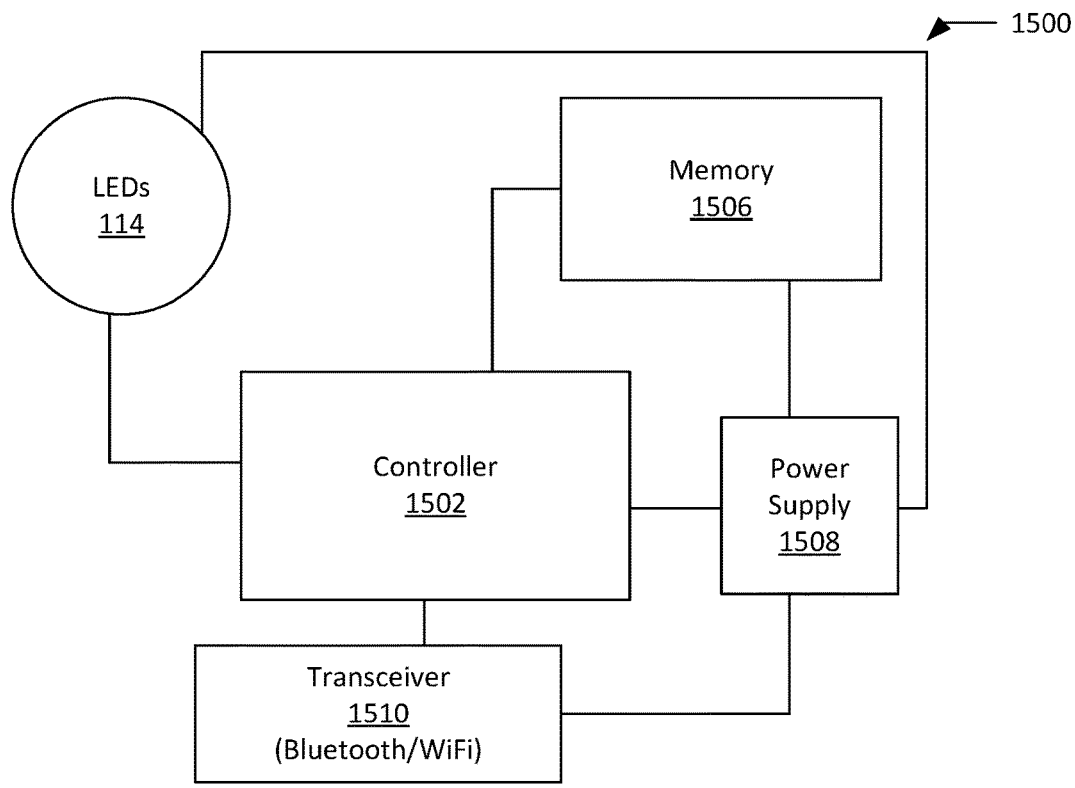
FIG. 15 is a block diagram of the candle holder of FIG. 1 with wires connecting the candle through the cake to the controller and power supply located in a base in accordance with an example implementation.

In FIG. 15, a block diagram 1500 of the candle holder 102 of FIG. 1 is depicted in accordance with an example implementation. A controller 1502 is in communication with LEDs 114, memory 1506, power supply 1508, and transceiver 1510. The transceiver 1510 allows the controller 1502 to communicate with other devices such as a smart device, fragrance device, wearable devices, televisions, or other candle type devices. The controller 1502 may be a microprocessor, such as an INTEL or AMD processor, a microcontroller such as a PARALLAX, Microchip Technology PIC, ATmega328 microcontroller, digital logic implemented as a state machine, analog state machine, or a combination of any of the above. The power supply 1508 may be a battery, capacitor, inductive, wired, or a combination of any of the above. The transceiver 1510 may be a separate transmitter and receiver that enables Bluetooth, WiFi, RF radio, or a combination of the above. In some embodiments, the smart device comprises a smartphone.

Figure 16:
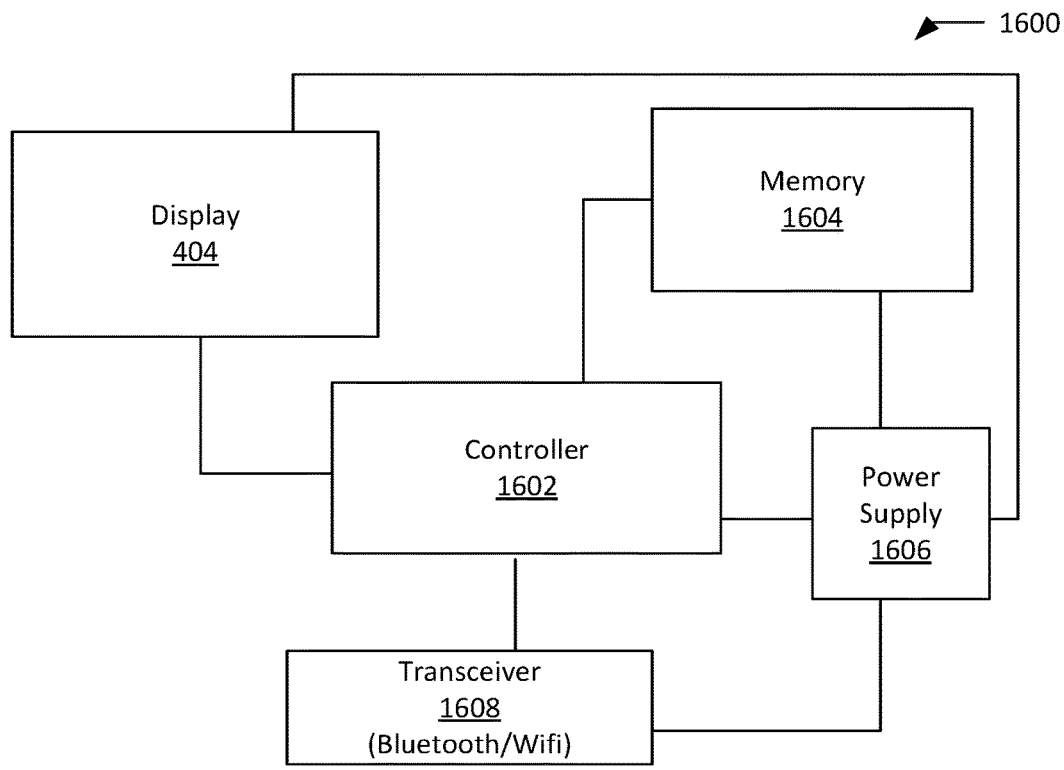
FIG. 16 is a block diagram of the candle of FIG. 4 in accordance with an example implementation.

Turning to FIG. 16, a block diagram 1600 of the candle holder 402 of FIG. 4 is depicted in accordance with an example implementation. A display (LED, OLED, LCD, a cathode-ray tube, or similar technology) 404 is coupled to the controller 1602. The controller 1602 is also coupled to memory 1604, power supply 1606, and transceiver 1608. Other implementations having displays may be implemented in a similar manner.

Figure 17:
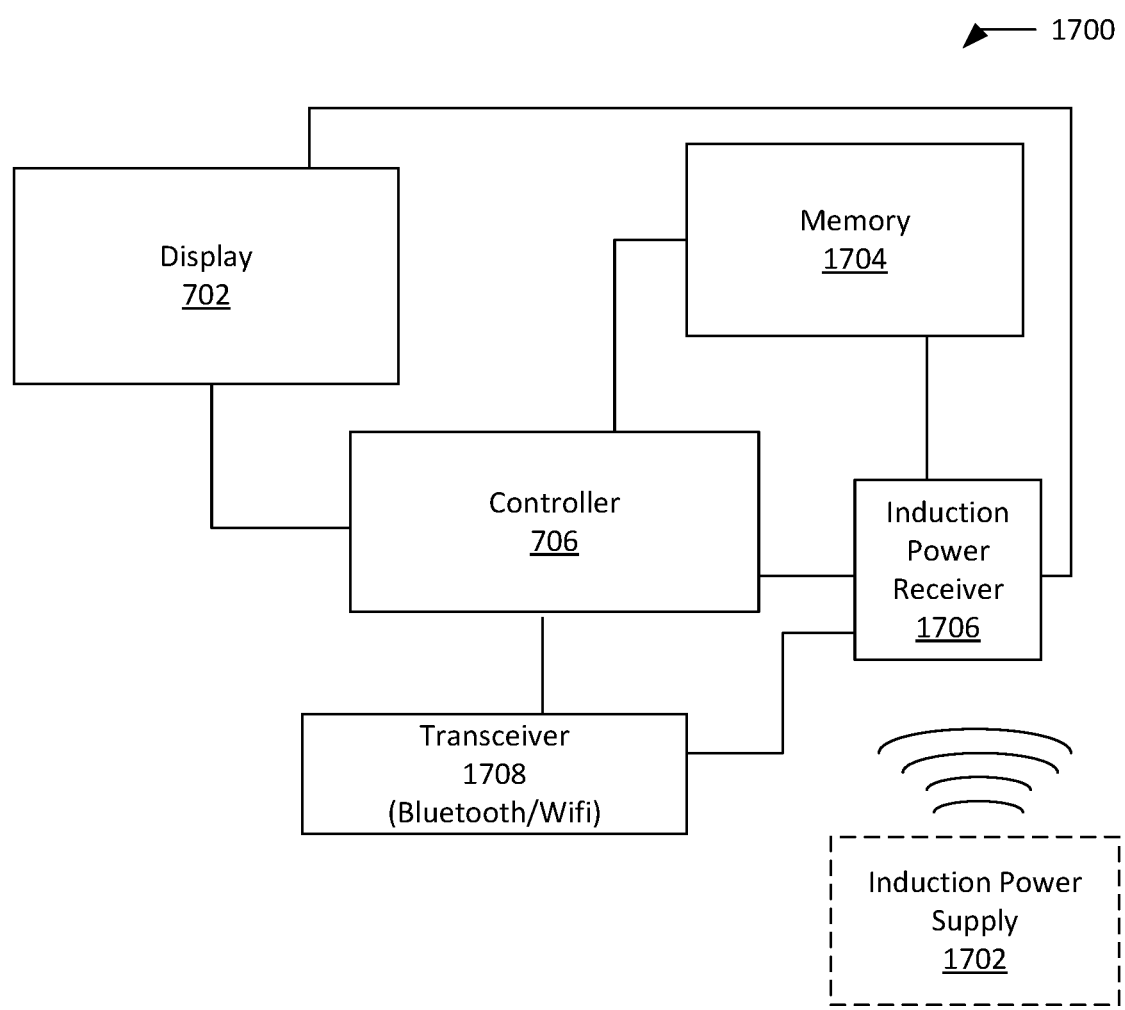
FIG. 17 is a block diagram of the induction powering of a display located on a cake of FIG. 7 in accordance with an example implementation.

In FIG. 17, a block diagram 1700 of induction power supply 1702 powering of a display 702 located on a cake 704 of FIG. 7 in accordance with an example implementation. The controller 706 is coupled to the display 702, memory 1704, transceiver 1708, and an induction power receiver 1706 that is located in base 708. The base is set on top of the induction power supply 1702 and powers the CDS via the induction power receiver 1706.

Figure 18:
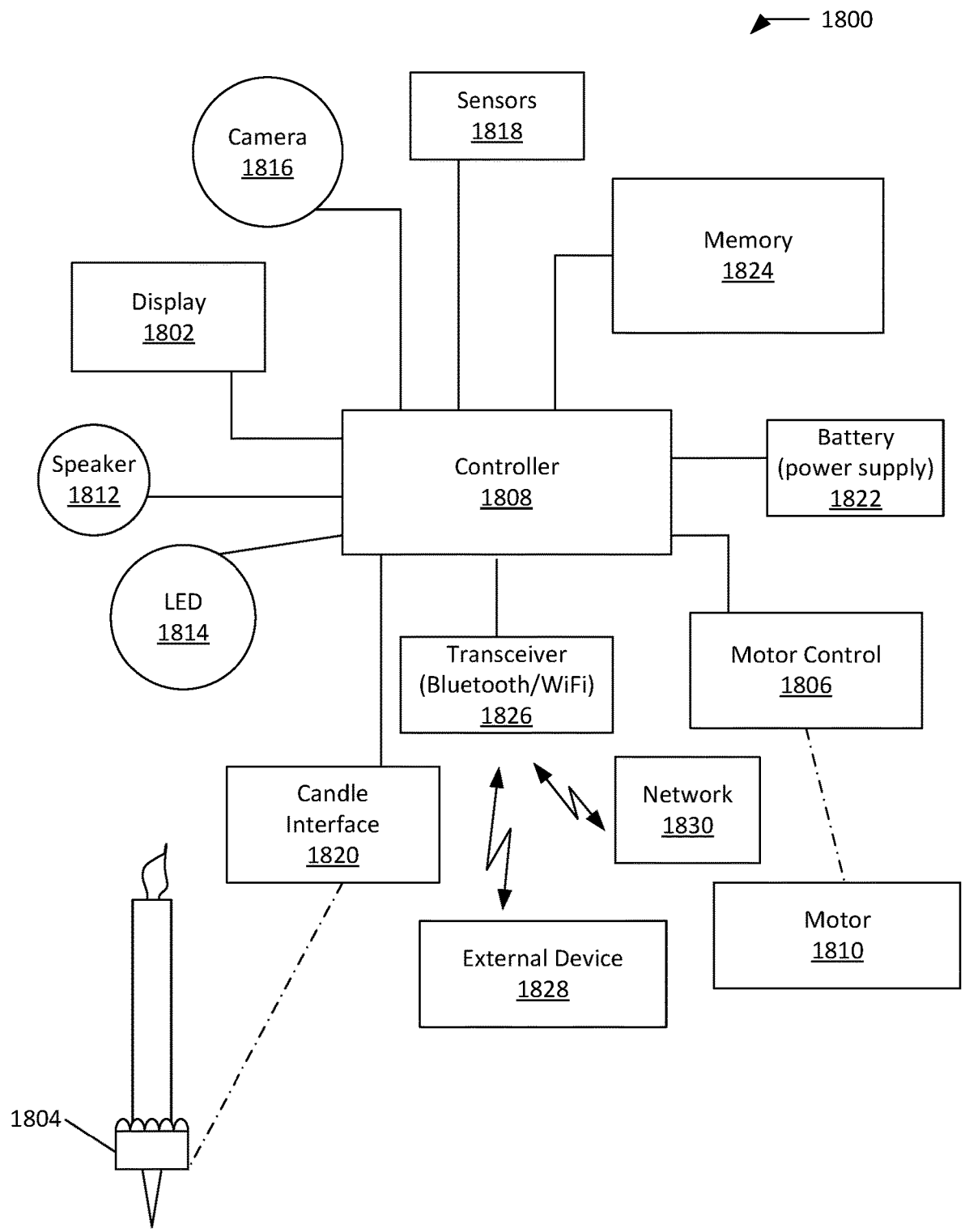
FIG. 18 is a block diagram of a cake display system with displays, candles, and motor in accordance with an example implementation.

In FIG. 18, a block diagram 1800 of a CDS with a display 1802, candle holder 1804, and motor controller 1806 is depicted in accordance with an example implementation. The controller 1808 is coupled to a motor control 1806 that operates a motor 1810 to move a decoration by or on the cake. The controller 1808 is also depicted as coupled to a speaker 1812, LED (lighting element) 1814, camera 1816, sensors 1818, candle interface 1820, along with a battery 1822, memory 1824, display 1802, and transceiver 1826. The transceiver 1826 communicates with external devices 1828, such as smart devices or other CDS decorations, for example, wearables, aroma machines, ornaments, streaming devices, and smart speakers. Sensors 1818 include light, sound, touch, infrared, Relays, buzzers, reed switches, photo-interrupt, Analog-to-Digital/Digital-to-Analog converters, moisture, potentiometers, analog hall sensor, temperature, thermistor, photoresistor, gas, rotary encoder, barometer, level, ultrasonic, and joystick to name but a few examples. The controller may be used to execute a program that is called a "show." A show may integrate music, lights, images, and video that is displayed on one or more displays and speakers of the CDS. Cameras and speakers may be used in the CDS to capture sound and images (still and video) and transmit to external devices 1828 and devices attached to the internet or another network 1830.

Figure 19:
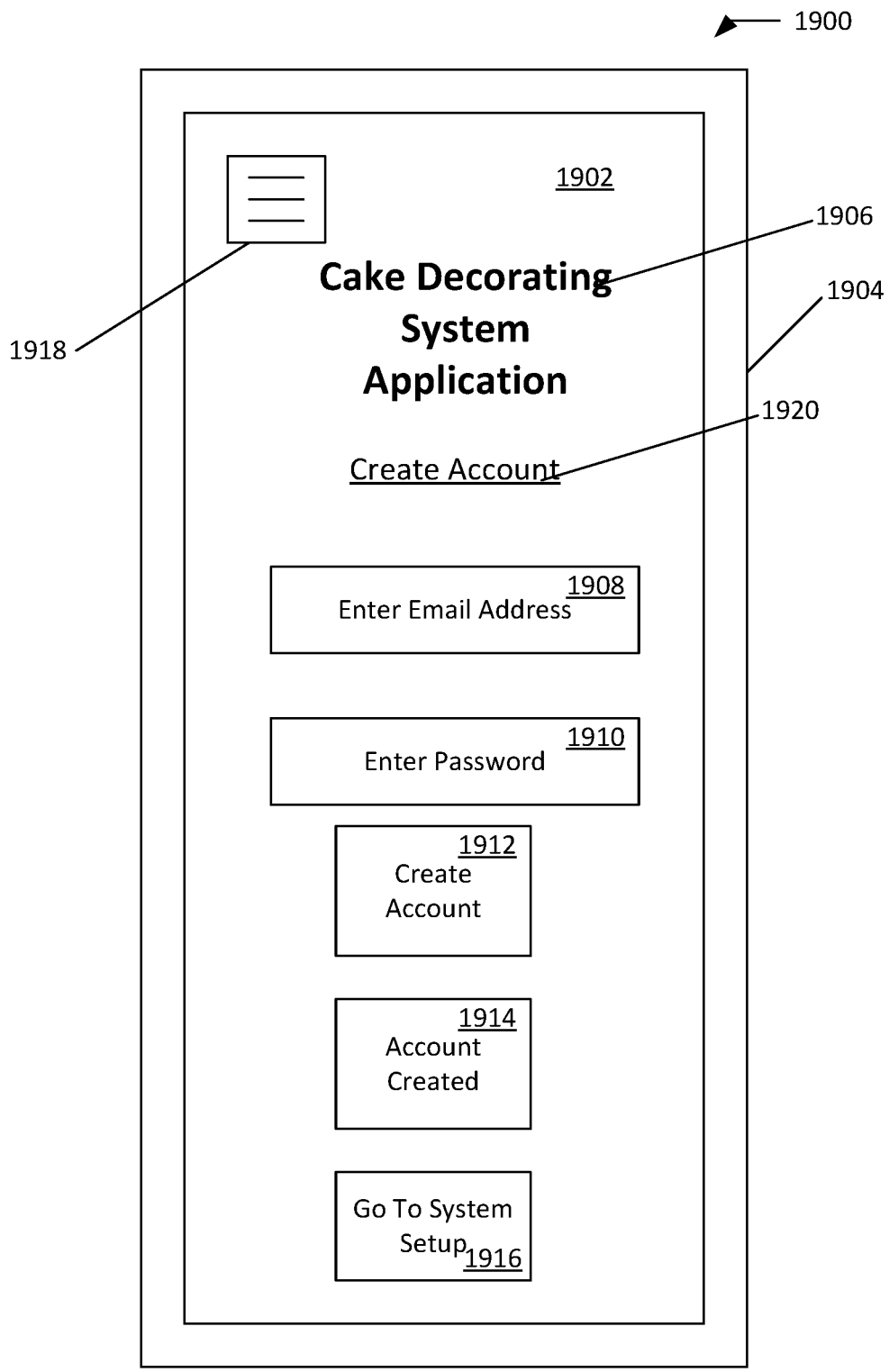
FIG. 19 is a diagram of a screen of a smart device that executes a CDS application with an interface to create a CDS account in accordance with an example implementation.

Turning to FIG. 19 is a diagram 1900 of a screen 1902 of a smart device 1904 that executes a CDS application 1906 with a user interface to create a CDS account 1920 in accordance with an example implementation. A user of the CDS enters an email address in the "Enter Email Address" Box 1908 and a password into the "Enter Password" box 1910. After the data is entered, the "Create Account" button 1912 may be selected. Once a CDS account is created, a confirmation email is sent to the email account (that can also be an email validation confirmation) and an "Account Created" confirmation 1914 displayed on the screen 1902. The user may then go to account setup by selecting the "Go To System Setup" button 1916. It is noted that in some implementations, the "Go To System Setup" button 1916 may be greyed until the email account has been validated. It is noted a pulldown menu 1918 is present in the current implementation and enables a user to go to other screens, such as help screen, access the manual, customer service, jump to other areas of the user interface.

Figure 20:
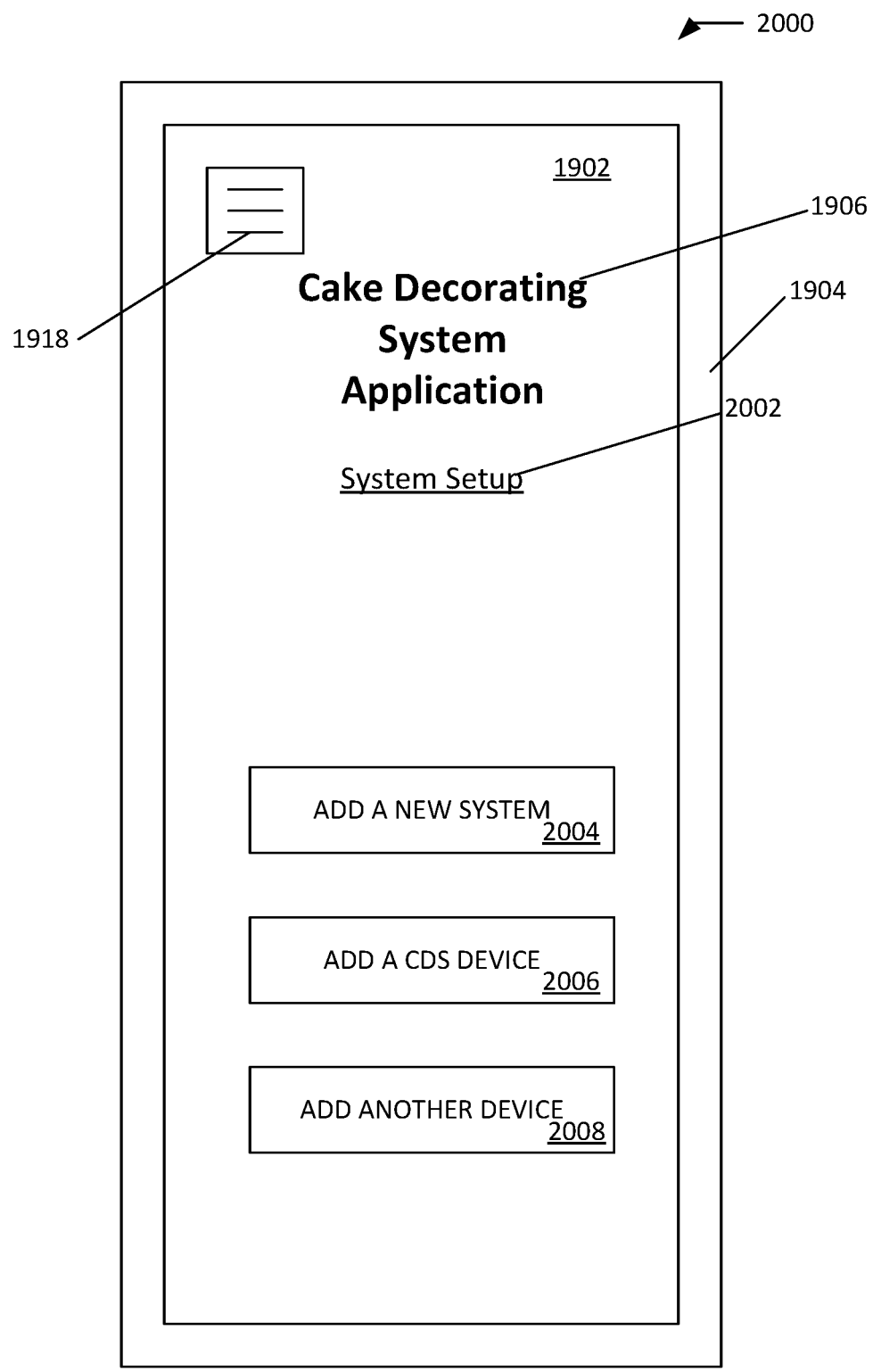
FIG. 20 is a diagram of a screen of a smart device that executes a CDS application with a system setup interface in accordance with an example implementation.

In FIG. 20 a diagram 2000 of a screen 1902 of a smart device 1904 that executes a CDS application 1906 with a system setup interface 2002 is depicted in accordance with an example implementation. A user may add a new CDS system by selecting the "ADD A NEW SYSTEM" button 2004. A CDS device may be added to an existing CDS system by selecting the "ADD A CDS DEVICE" 2006. If a non-CDS device is desired to be added to an existing CDS system, then the "ADD ANOTHER DEVICE" button 2008 is selected. The pulldown menu 1918 is also present on the system setup interface 2002.

Figure 21:
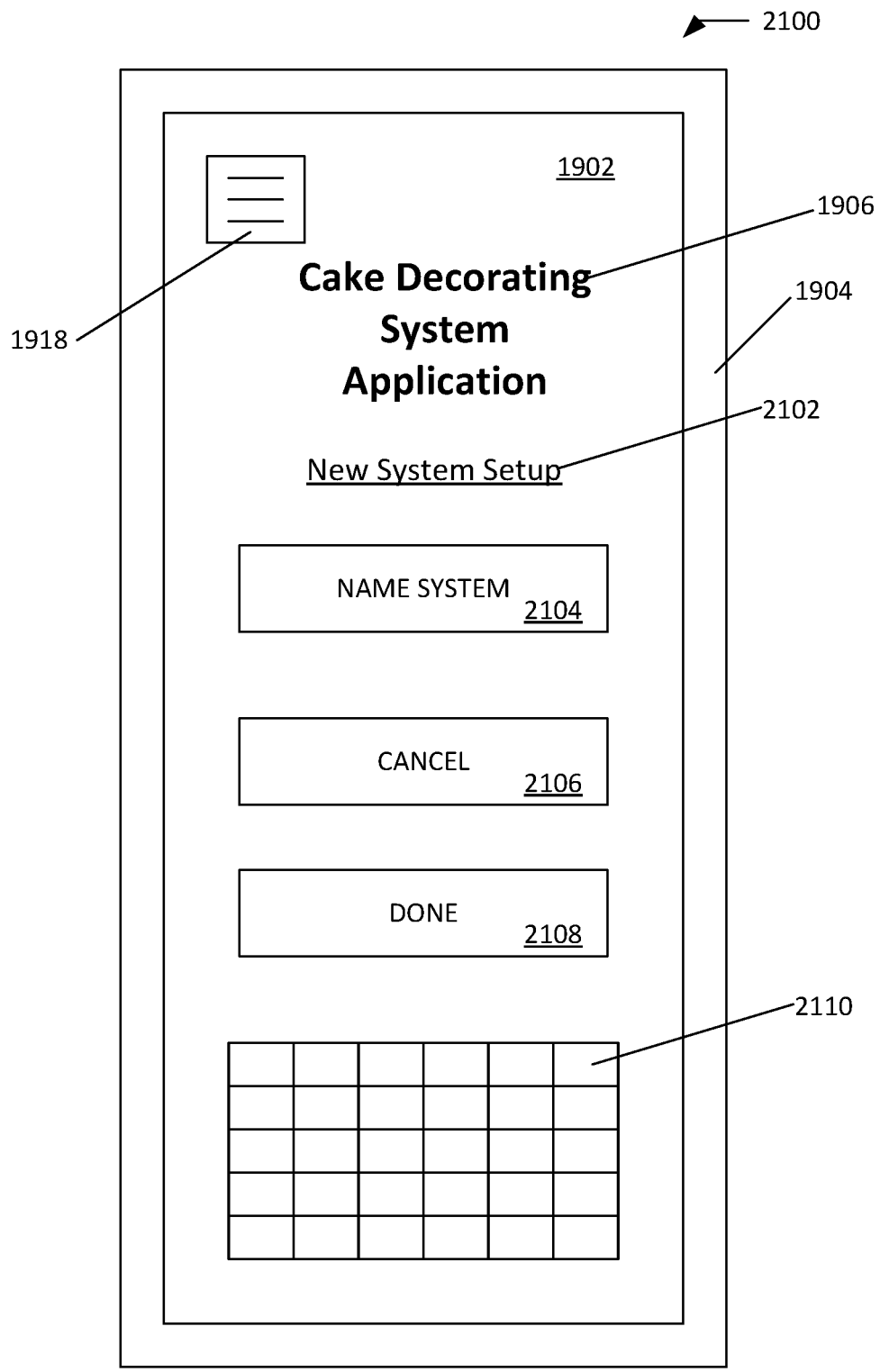
FIG. 21 is a diagram of a screen of a smart device that executes a CDS application with a new system setup interface in accordance with an example implementation.

Turning to FIG. 21, a diagram 2100 of a screen 1902 of a smart device 1904 that executes a CDS application 1906 with a new system setup interface 2102 is depicted in accordance with an example implementation. The name of the CDS system is entered into the "NAME SYSTEM" text box 2104. The setting up of the system may be canceled by selecting the "CANCEL" button 2106 or if a name has been entered into text box 210, the "DONE" button 2108 may be selected to have the system name entered. When text is being entered into a text box, the CDS application 1906 may bring up a soft keyboard 2110 that a user may use to enter text. A pulldown menu 1918 may also be present on the new system setup interface 2102. The entries in the pulldown menu 1918 may change depending upon which system interface page is being accessed.

Figure 22:
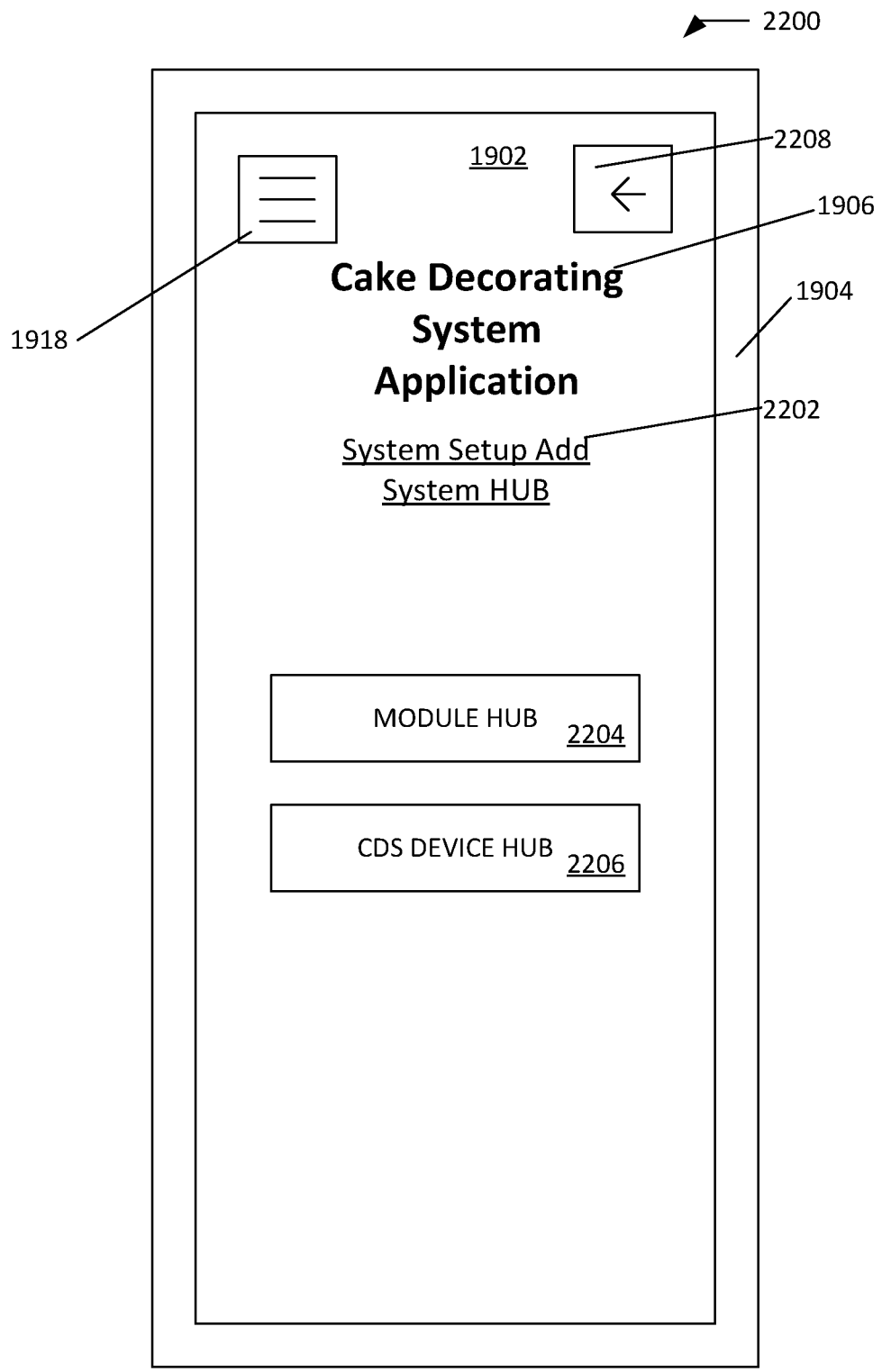
FIG. 22 is a diagram of a screen of a smart device that executes a CDS application that adds a system HUB in accordance with an example implementation.

In FIG. 22, a diagram 2200 of a screen 1902 of a smart device 1904 that executes a CDS application 1906 with an add system HUB interface 2202 is depicted in accordance with an example implementation. In order to add a HUB, the button for the type of HUB to add is selected. A HUB is a device that is able to communicate with and control multiple devices (CDS devices and non-CDS devices) in the CDS system. For a Module HUB (Non-CDS device HUB), the "MODULE HUB" button 2204 is selected. To add a CDS device HUB, the "CDS DEVICE HUB" button 2206 is selected. A pulldown menu 1918 and back button 2208 may also be available on the add system HUB interface 2202.

Figure 23:
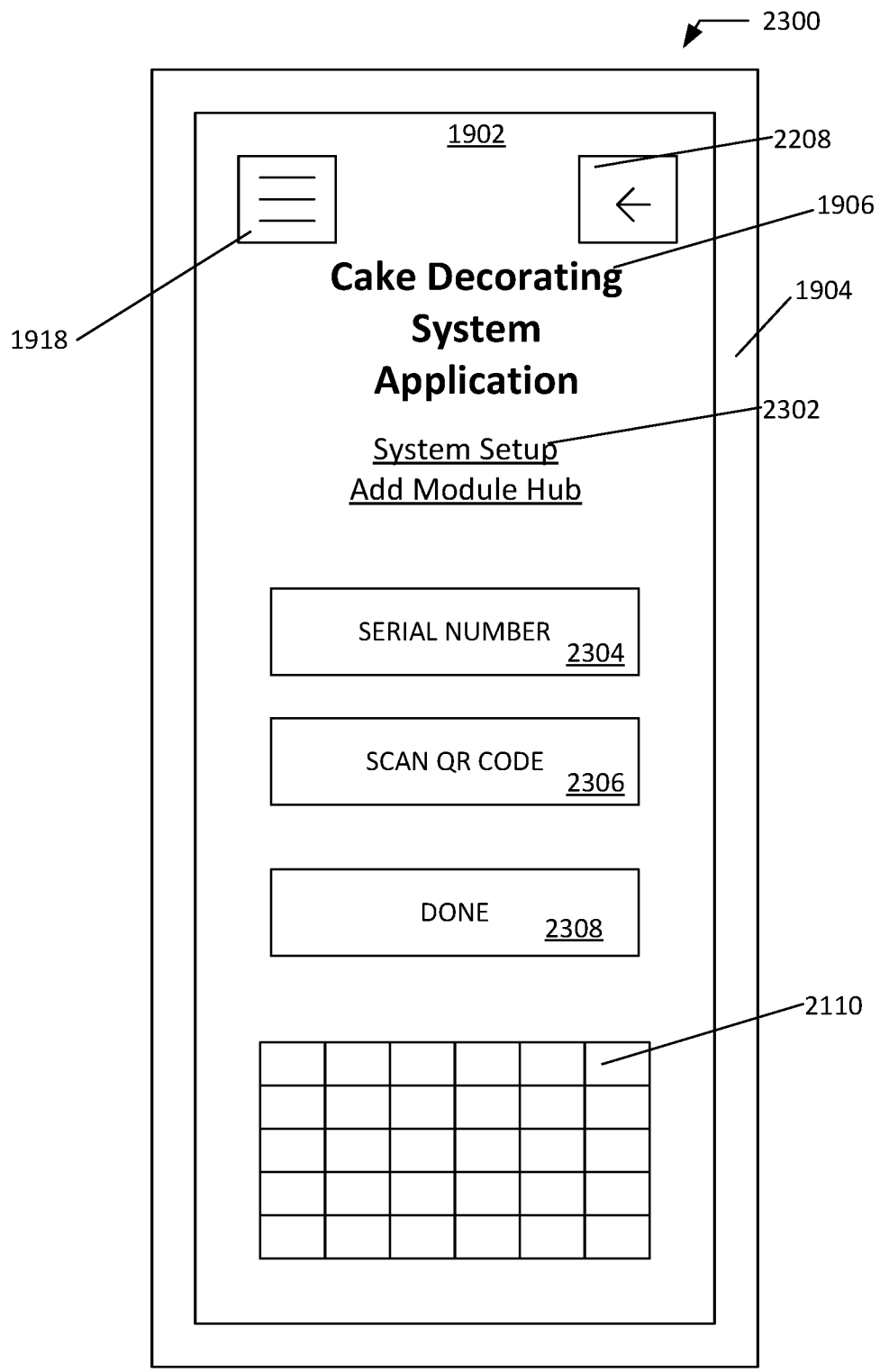
FIG. 23 is a diagram of a screen of a smart device that executes a CDS application that identifies the system HUB of FIG. 22 in accordance with an example implementation.

Turning to FIG. 23, a diagram 2300 of a screen 1902 of a smart device 1904 that executes a CDS application 1906 that identifies the system module HUB interface 2302 for the HUB selected in FIG. 22 is depicted in accordance with an example implementation. The interface is accessed in response to the selection of the "MODULE HUB" button 2204 of FIG. 22. The serial number of the module HUB is entered into the SERIAL NUMBER text box 2304. The soft keyboard 2110 may be presented for entry of the module HUB's serial number. If a QR code is on the module HUB, it may be scanned using a camera that may be part of the smart device 1904. In order to scan a QR code, the "SCAN QR CODE" button 2306 is selected and then the QR code is read by a camera in the smart device 1904. The resulting serial number that is scanned, is then placed into the SERIAL NUMBER text box 204. Once the serial number is entered, the "DONE" button 2308 may be pressed and the entered serial number saved in the memory of the CDS.

Figure 24:
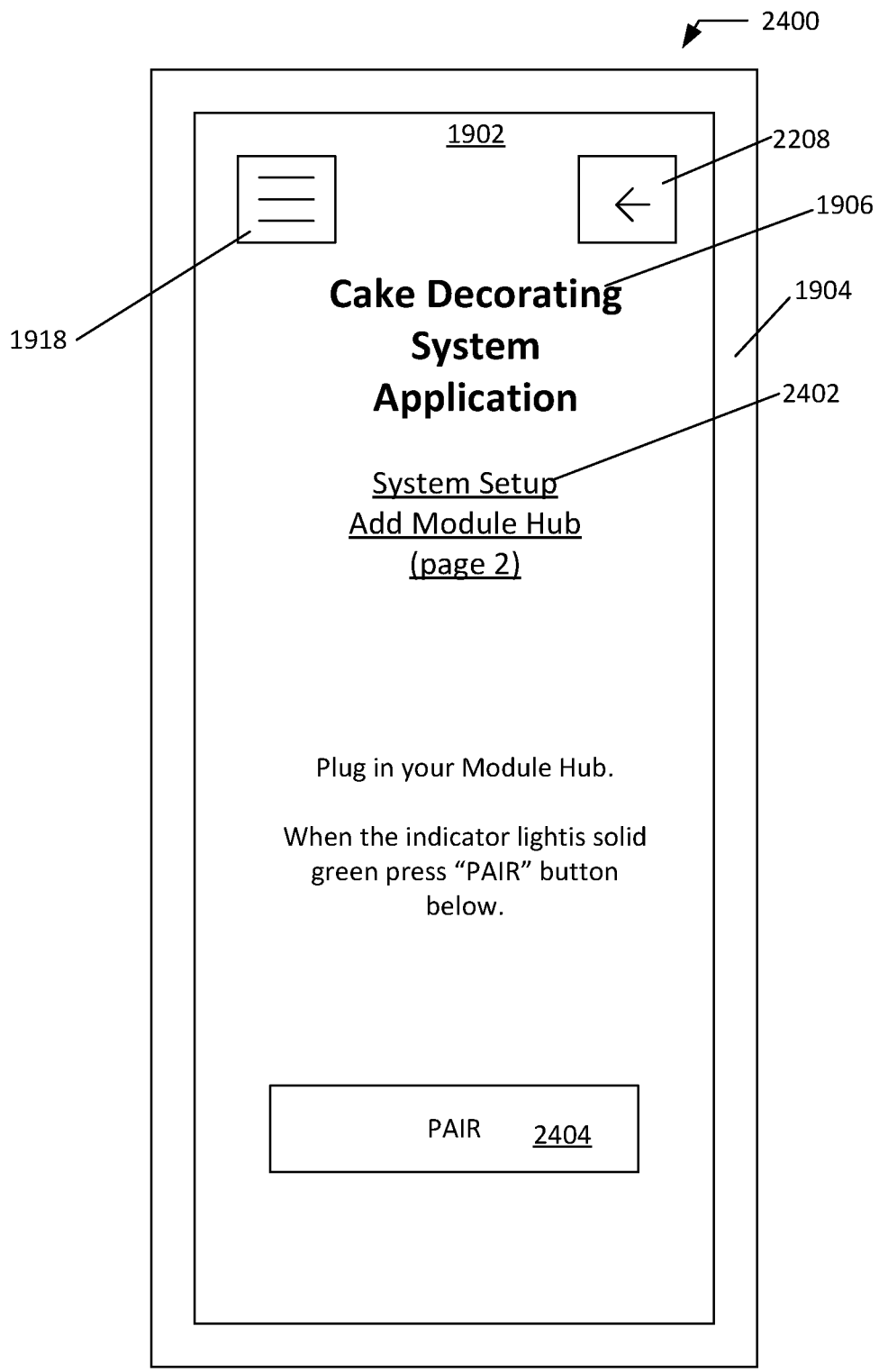
FIG. 24 is a diagram of a screen of a smart device that executes a CDS application pairs the system HUB of FIG. 22 in accordance with an example implementation.

In FIG. 24, a diagram 2400 of a screen 1920 of a smart device 1904 that executes a CDS application 1906 provides an interface 2402 that pairs the system HUB with the CDS for the HUB selected in FIG. 22 is depicted in accordance with an example implementation. The module hub is plugged in and/or energized. Once an indicator, such as a flashing LED light identifies that module hub to be in a pairing state, the "PAIR" button 2404 in the interface 2404 is selected to pair the device with the CDS system. A pulldown menu 1918 and back button 2208 may also be present in the interface 2402.

Figure 25:
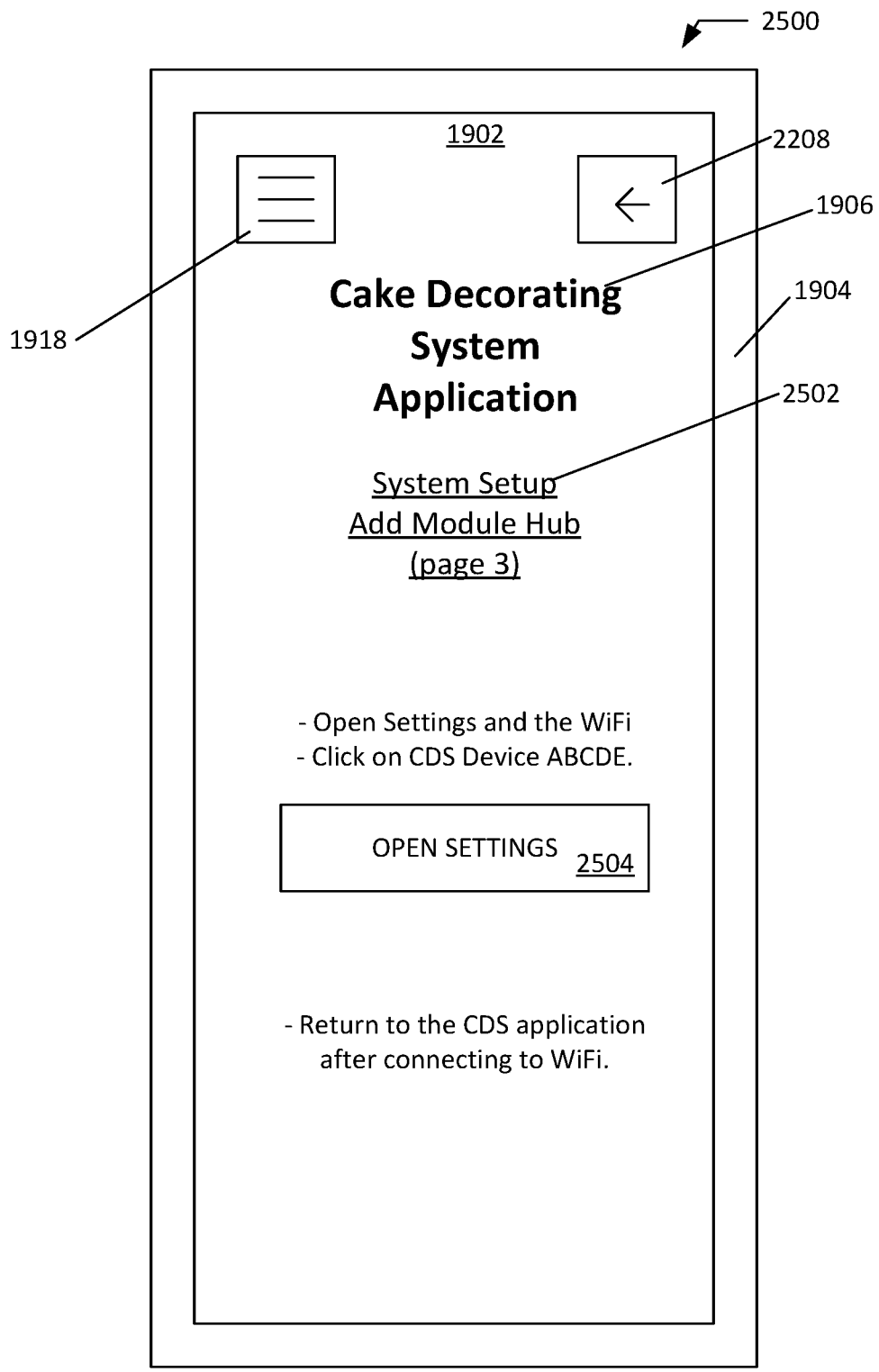
FIG. 25 is a diagram of a screen of a smart device that executes a CDS application and configures WiFi for the system HUB of FIG. 22 in accordance with an example implementation.

In FIG. 25, a diagram 2500 of a screen 1902 of a smart device 1904 that executes a CDS application 1906 and provides an interface 2502 that configures WiFi for the module HUB of FIG. 22 is depicted in accordance with an example implementation. The user is able to open the settings of the paired module HUB by pressing the "OPEN SETTINGS" button 2504. One the module HUB is connected to Wifi, the user is returned to the CDS application 1906. The pulldown menu 1918 and back button 2208 are depicted in the user interface 2502.

Figure 26:
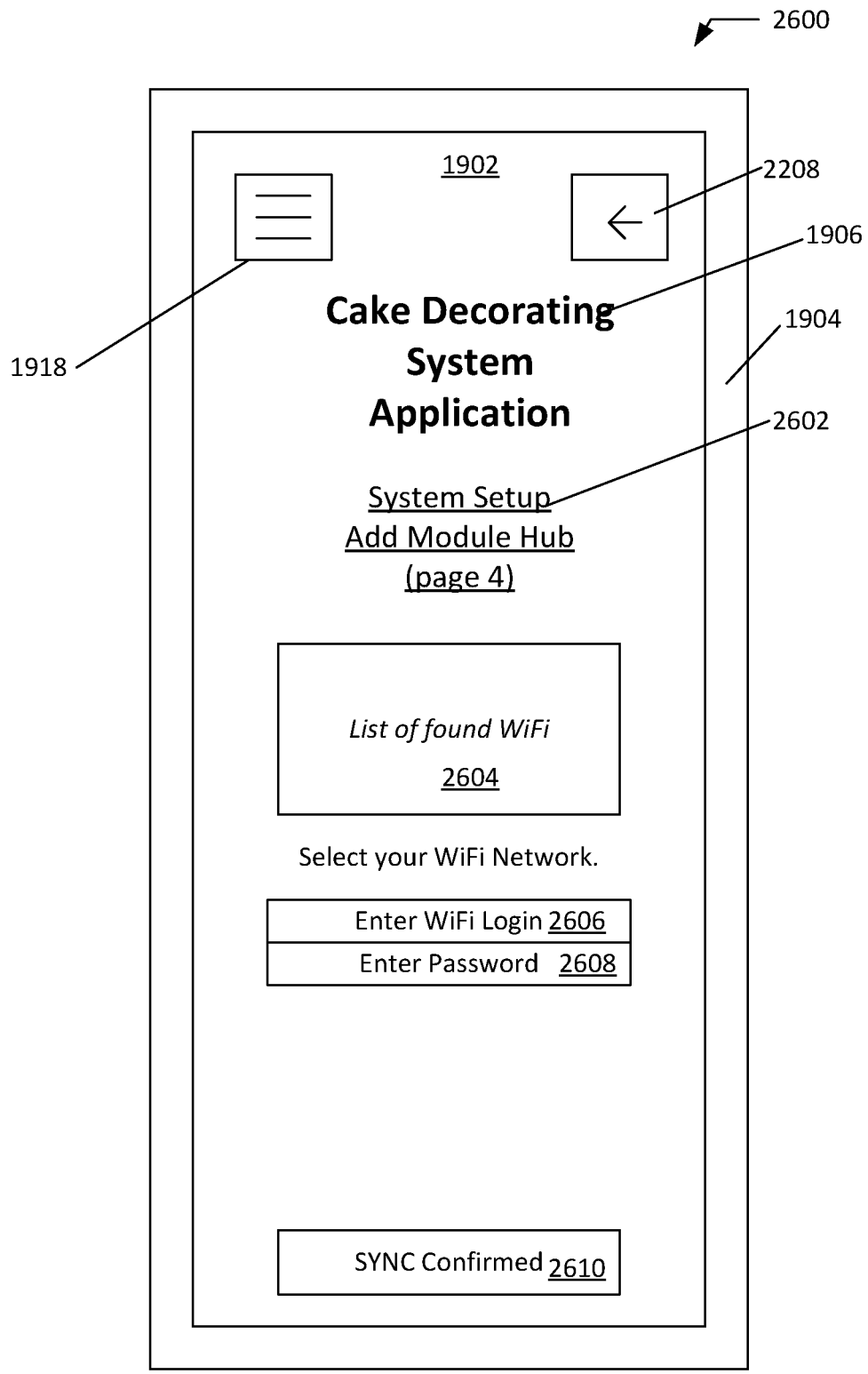
FIG. 26 is a diagram of a screen of a smart device that executes a CDS application for accessing WiFi from the system HUB of FIG. 22 in accordance with an example implementation.

Turning to FIG. 26, a diagram of a screen 1902 of a smart device 1904 that executes a CDS application 1906 with an interface 2602 for accessing WiFi from the module HUB of FIG. 22 is depicted in accordance with an example implementation. A list of found WiFi networks is provided in a window 2604 in the user interface 2502. The user selects which network to join by picking the network in the window 2604 using the touch screen or pointer device of the smart device 1904. Once selected, the login and password are entered in the textboxes 2606 and 2608. Once the data is entered, the SYNC Confirmed indicator 2610 will change color from red to green if the module HUB is operating on the selected WiFi network. The pulldown menu 1918 and back button 2208 are depicted in the user interface 2602.

It is noted that a similar approach (FIGS. 23-26) as used to configure a module HUB is used to configure a CDS device HUB by selecting "CDS DEVICE HUB" button 2206 in figure.

Figure 27:
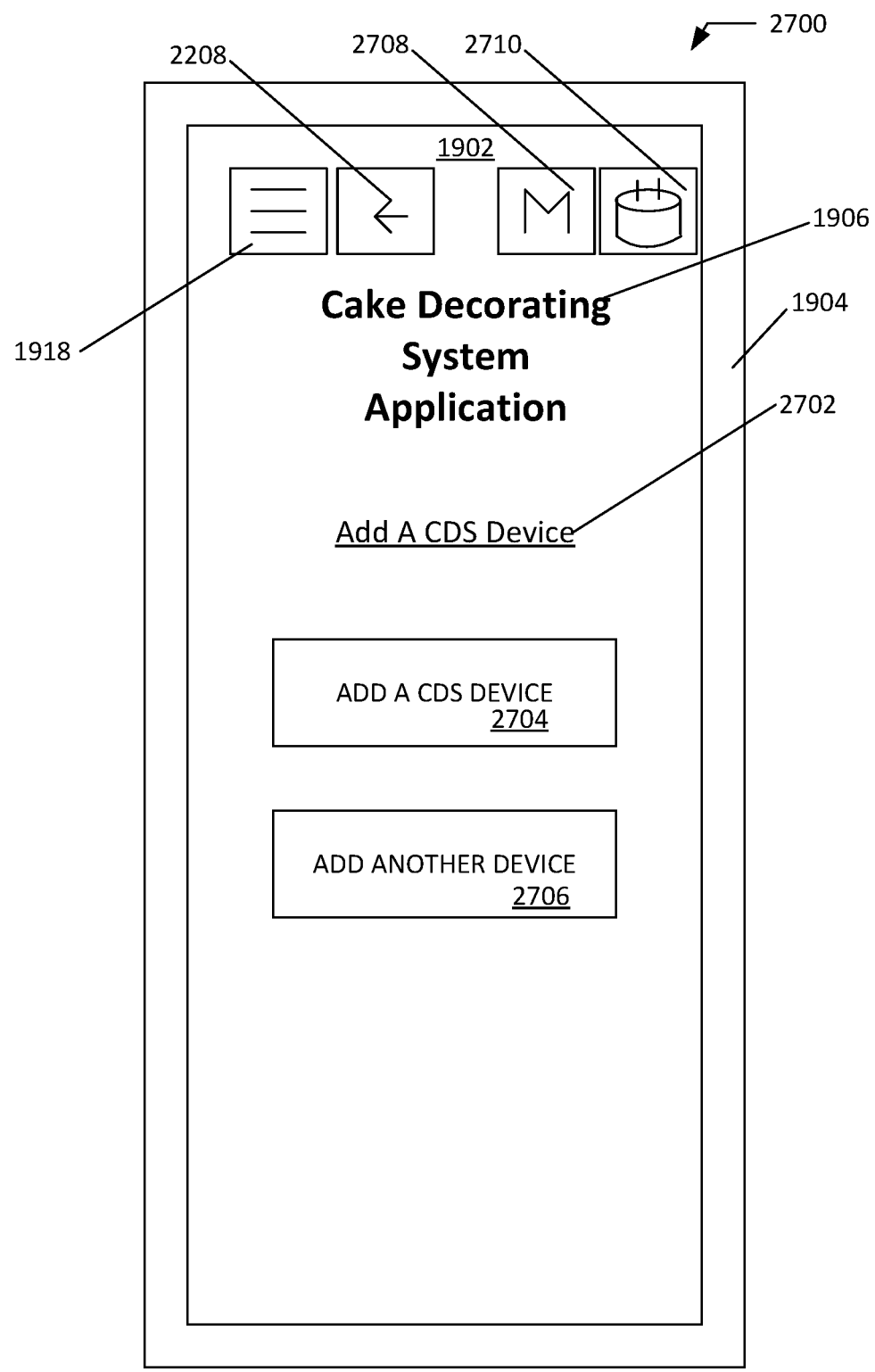
FIG. 27 is a diagram of a screen of a smart device that executes a CDS application that adds a CDS device in accordance with an example implementation.

In FIG. 27, a diagram 2700 of a screen 1902 of a smart device 1904 that executes a CDS application 1906 with an interface 2702 that adds a CDS device to the CDS system is depicted in accordance with an example implementation. The user either selects the button "ADD A CDS DEVICE" 2704 or "ADD ANOTHER DEVICE" 2706 depending upon the type of device being added to the CDS system. A MAIN MENU button 2708 may be present in the interface 2702 for returning to the main menu. A list of CDS devices may also be accessed in the interface 2702 by selecting the CDS DEVICES button 2710.

Figure 28:
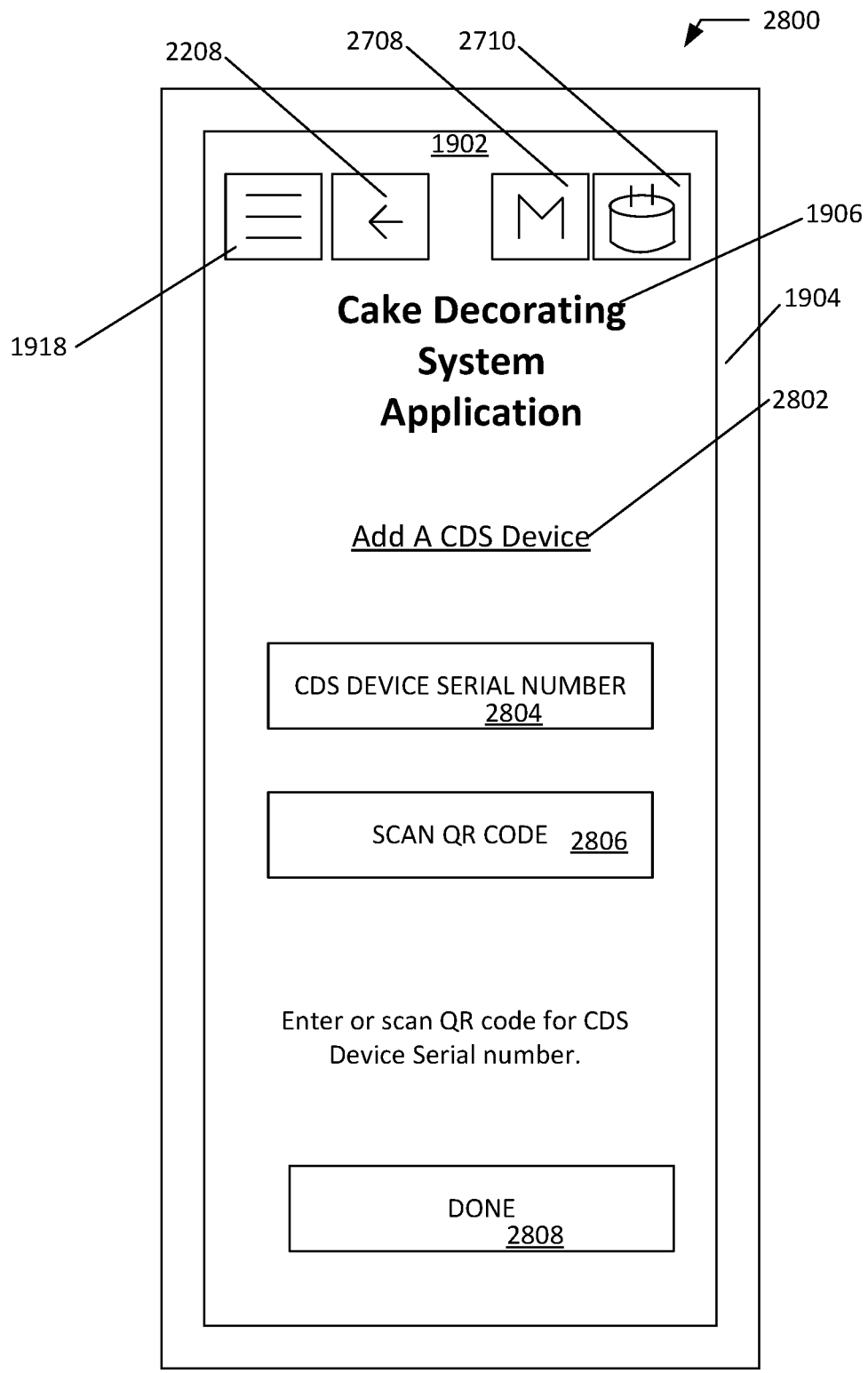
FIG. 28 is a diagram of a screen of a smart device that executes a CDS application that adds a CDS device in accordance with an example implementation.

Turning to FIG. 28, a diagram 2800 of a screen 1902 of a smart device 1904 that executes a CDS application 1906 that has a user interface 2802 that adds a CDS device in accordance with an example implementation. The serial number of the CDS device is added in the text box 2804 either by scanning a QR code with the "SCAN QR CODE" button 2806 or directly entering the data. In other implementations, different codes other than QR codes may be used to enter the serial number. These other codes include codes accessed in a memory or other visible codes that may be mechanically read. Once the serial number is entered in the CDS Device Serial Number textbox 2804 the user may select the "DONE" button 2808 to commit the serial number in the memory of the system.

Figure 29:
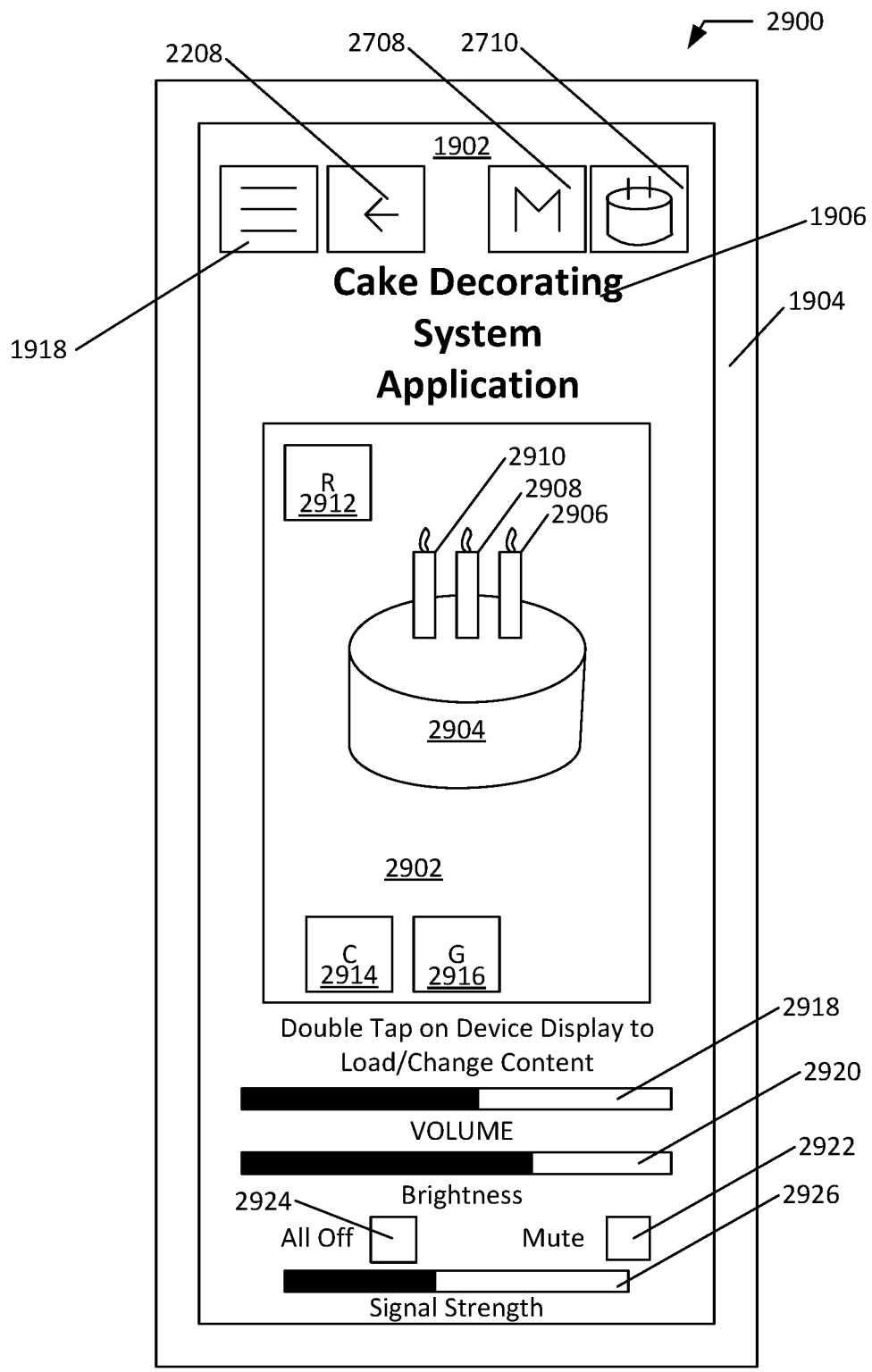
FIG. 29 is a diagram of a screen of a smart device that executes a CDS application that controls a "show" in accordance with an example implementation.

In FIG. 29, a diagram 2900 of a screen 1902 of a smart device 1904 that executes a CDS application 1906 that has a user interface that controls a "show" in accordance with an example implementation. The CDS display 2902 shows the CDS devices (cake display 2904, candles 2906, 2908, and 2910) that are arrangeable within the display 2902. The images in the display may be rotated using the rotate button 2912 in the CDS display 2902. A picture of the live room and decorations may be captured and displayed on CDS display 2902 using the camera button 2914. A user may switch between the picture view and a graphical image view of the CDS in the CDS display 2902 using the graphic button 2916. The volume of a "show" may be set using the volume slider 2918. The brightness of the "show" may also be set using slider 2920. The "show" may be turned off using the all off button 2924 or muted using the mute button 2922. An indication of the signal strength of the signal with the CDS devices is depicted in graphic 2926. The interface may also have the dropdown menu 1918, back button 2208, main menu button 2708, and CDS device list button 2710.

Figure 30:
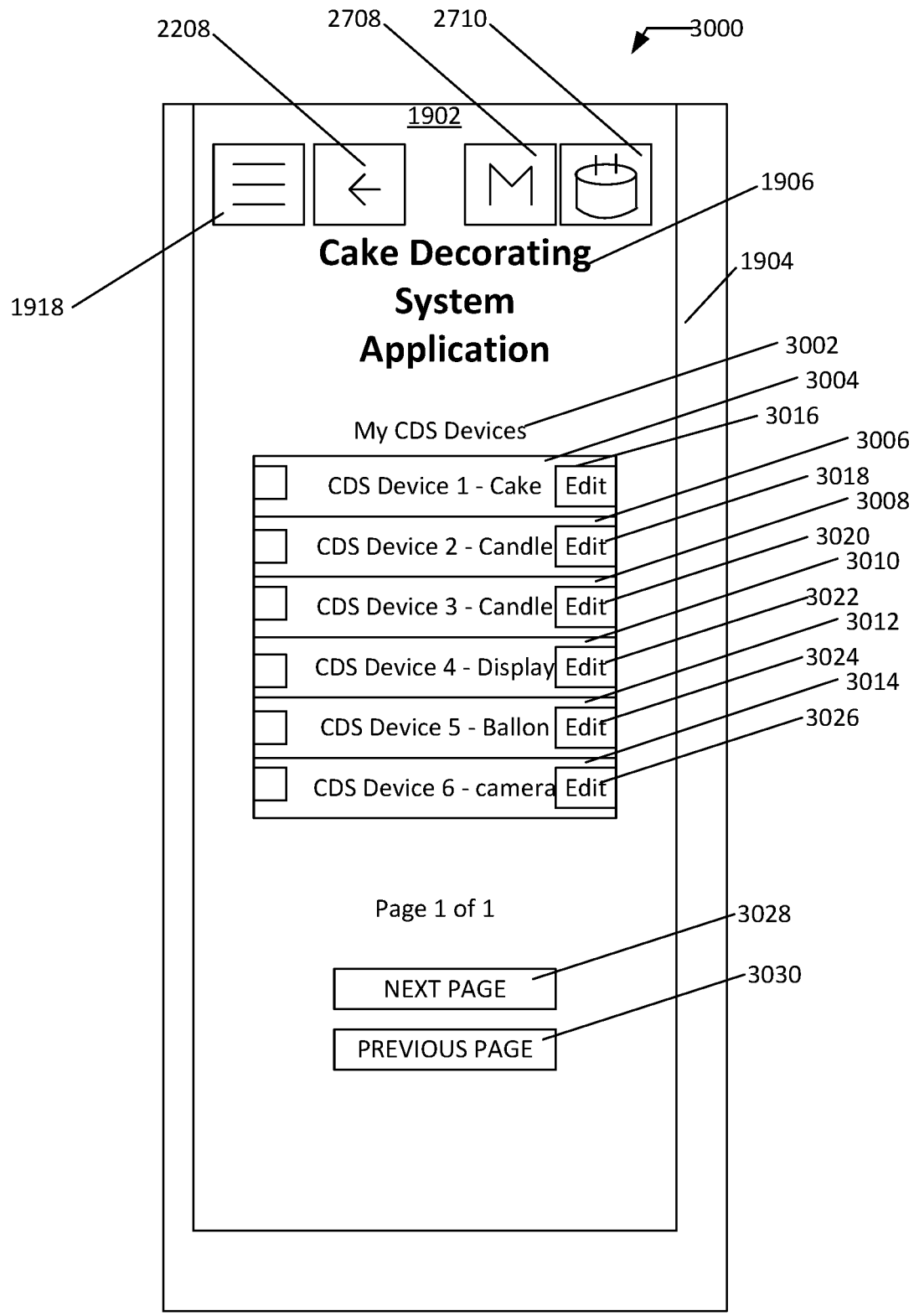
FIG. 30 is a diagram of a screen of a smart device that executes a CDS application that lists the CDS devices configured in the CDS in accordance with an example implementation.

Turning to FIG. 30, a diagram 3000 of a screen 1902 of a smart device 1904 that executes a CDS application 1906 provides an interface 3002 that lists the CDS devices configured is depicted in accordance with an example implementation. A list of the different configured CDS devices is provided 3004-3014 which are each editable 3016-3026. Multiple pages of CDS devices may be configured with the "NEXT PAGE" button 3028 and "PREVIOUS PAGE" button 3030 is used to move between pages in the interface 3002. The interface 3002 may also have the dropdown menu 1918, back button 2208, main menu button 2708, and CDS device list button 2710.

Figure 31:
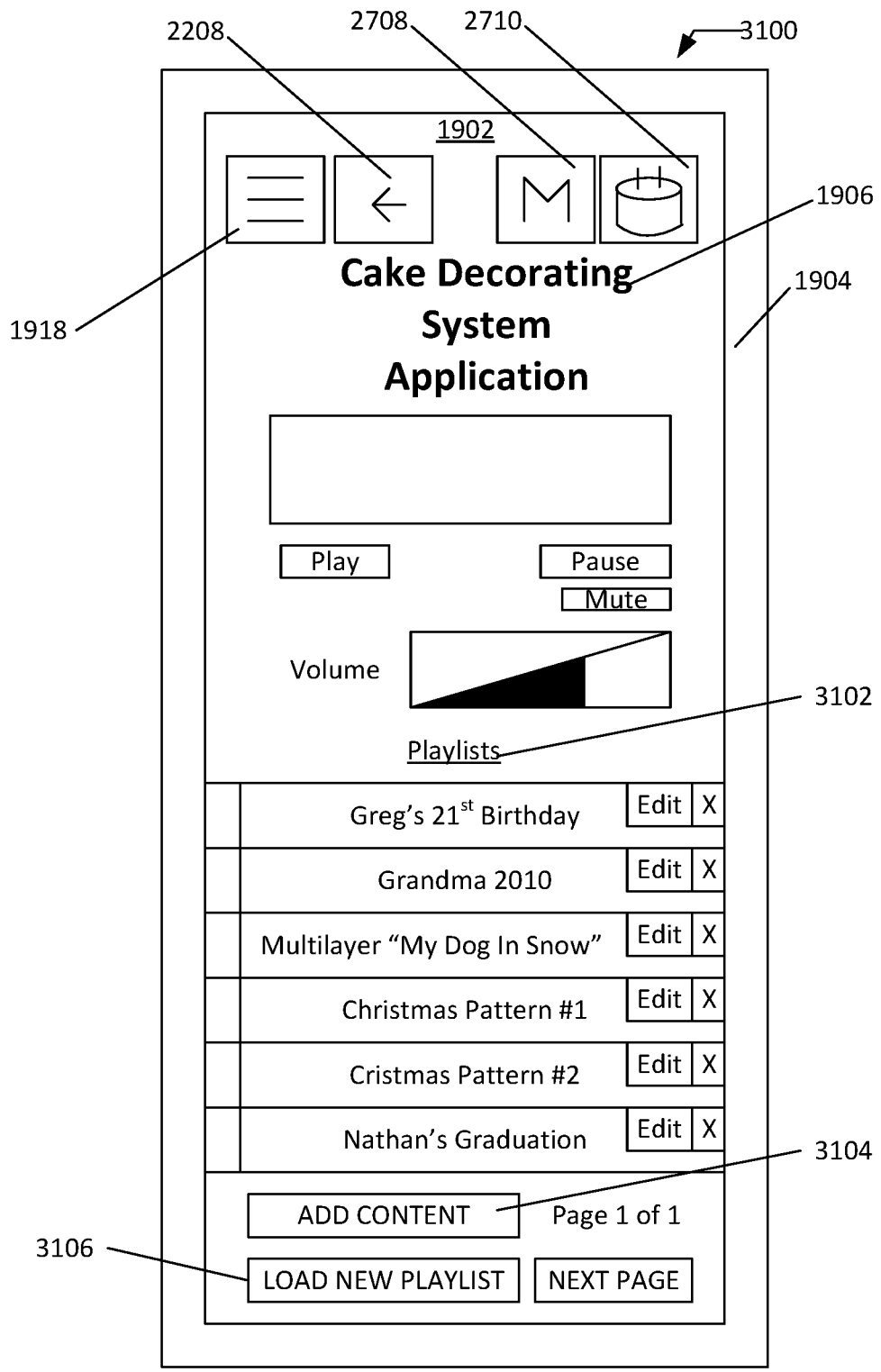
FIG. 31 is a diagram of a screen of a smart device that executes a CDS application that lists the playlist of shows in accordance with an example implementation.

In FIG. 31, a diagram 3100 of a screen 1902 of a smart device 1904 that executes a CDS application 1906 that provides a user interface for the playlist of shows 3102 is depicted in accordance with an example implementation. The different shows are listed and if needed, additional pages may be accessed. Content may be added with the "ADD CONTENT" button 3104 and a new playlist loaded with the "LOAD NEW PLAYLIST" button 3106. The interface 3102 may also have the dropdown menu 1918, back button 2208, main menu button 2708, and CDS device list button 2710.

Figure 32:
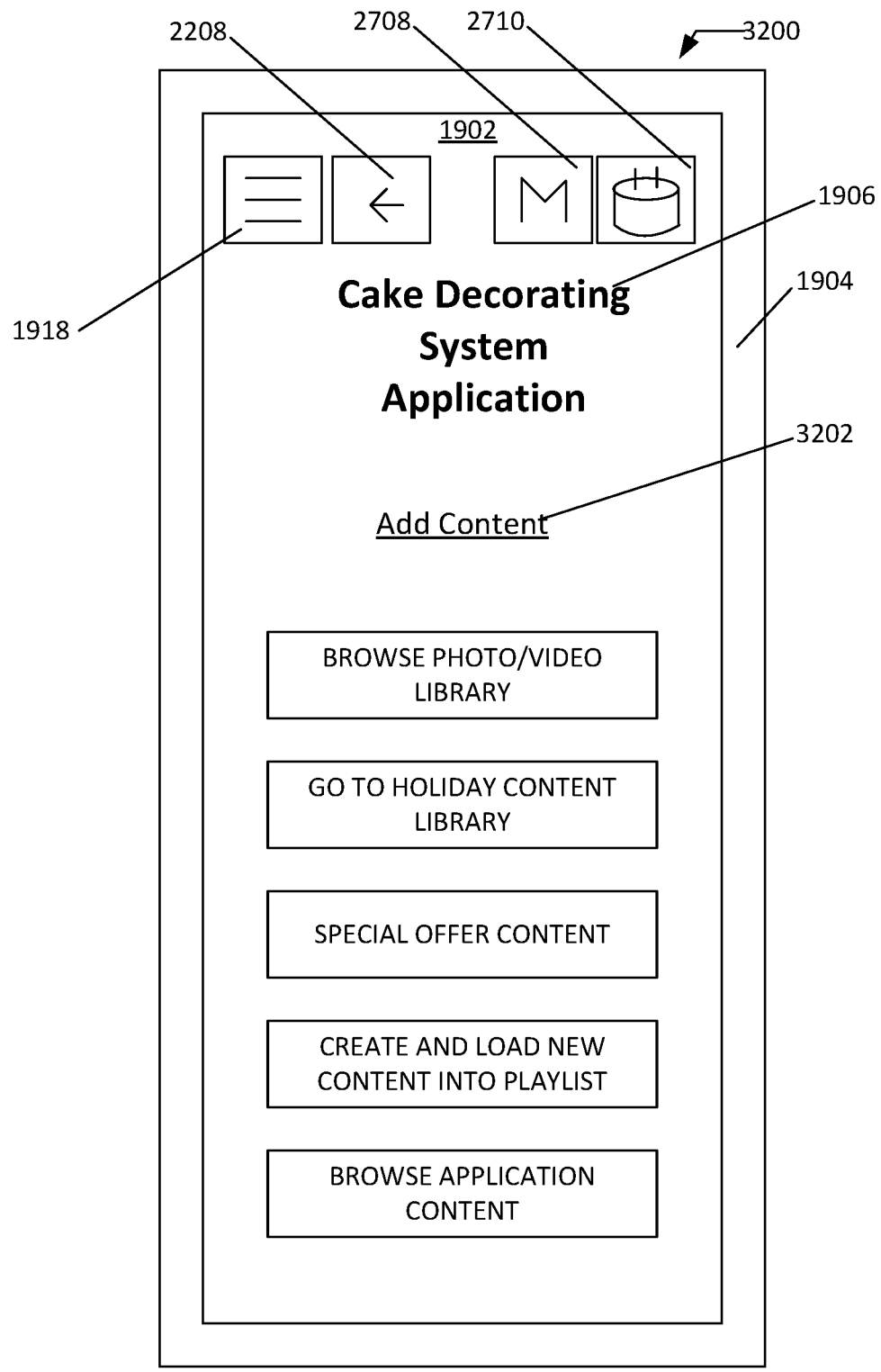
FIG. 32 is a diagram of a screen of a smart device that executes a CDS application that enables content in the CDS in accordance with an example implementation.

Turning to FIG. 32, a diagram 3200 of a screen 1902 of a smart device 1904 that executes a CDS application 1906 that provides an interface to add content 3202 in the CDS in accordance with an example implementation. Photographs, Holiday content, special offer content, loading content into a playlist, and just browsing CDS application content can be achieved in the interface to add content 3202. The interface 3202 may also have the dropdown menu 1918, back button 2208, main menu button 2708, and CDS device list button 2710.

Figure 33:
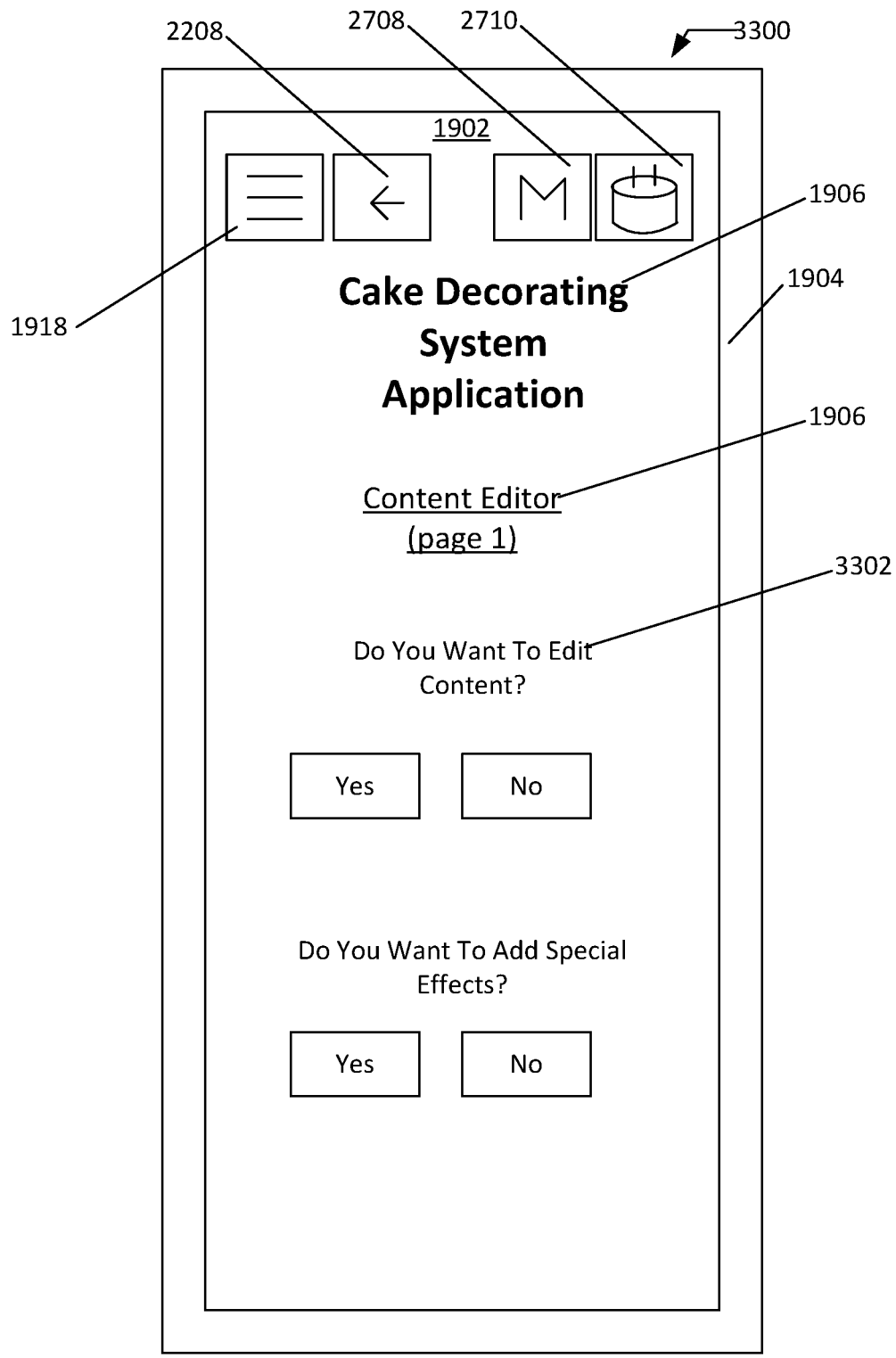
FIG. 33 is a diagram of a screen of a smart device that executes a CDS application that enables content to be edited in the CDS in accordance with an example implementation.

In FIG. 33, a diagram 3300 of a screen 1902 of a smart device 1904 that executes a CDS application 1906 with a user interface 3302 that enables content to be edited in the CDS in accordance with an example implementation. Content loaded in FIG. 32, may be edited using the controls and button in user interface 3302. The interface 3302 may also have the dropdown menu 1918, back button 2208, main menu button 2708, and CDS device list button 2710.

Figure 34:
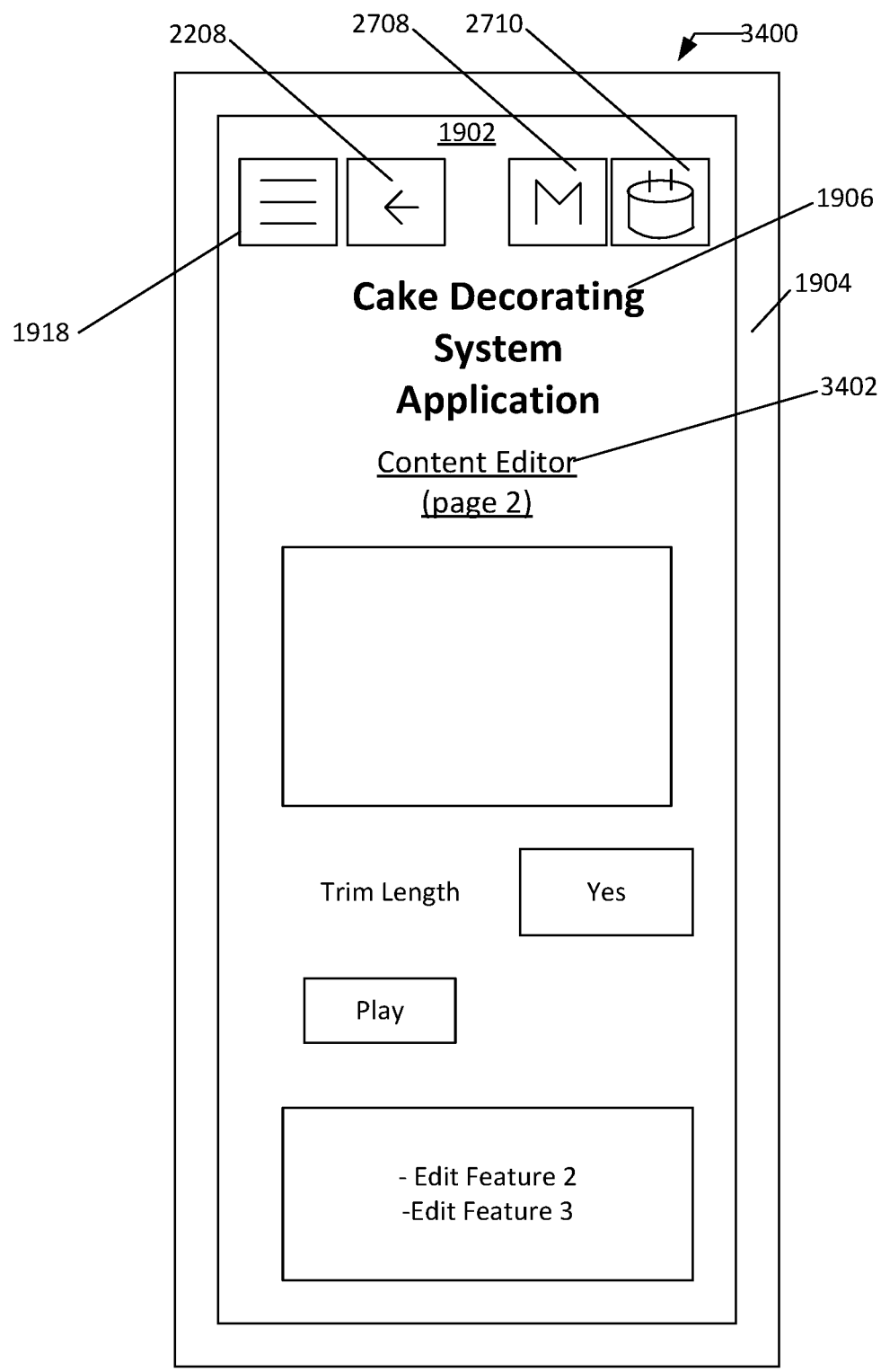
FIG. 34 is a diagram of a screen of a smart device that executes a CDS application that further enables content to be edited in the CDS in accordance with an example implementation.

Turning to FIG. 34, a diagram 3400 of a screen 1902 of a smart device 1904 that executes a CDS application 1906 with an interface 3402 that further enables content to be edited in the CDS in accordance with an example implementation is depicted. The interface 3402 may also have the dropdown menu 1918, back button 2208, main menu button 2708, and CDS device list button 2710.

Figure 35:
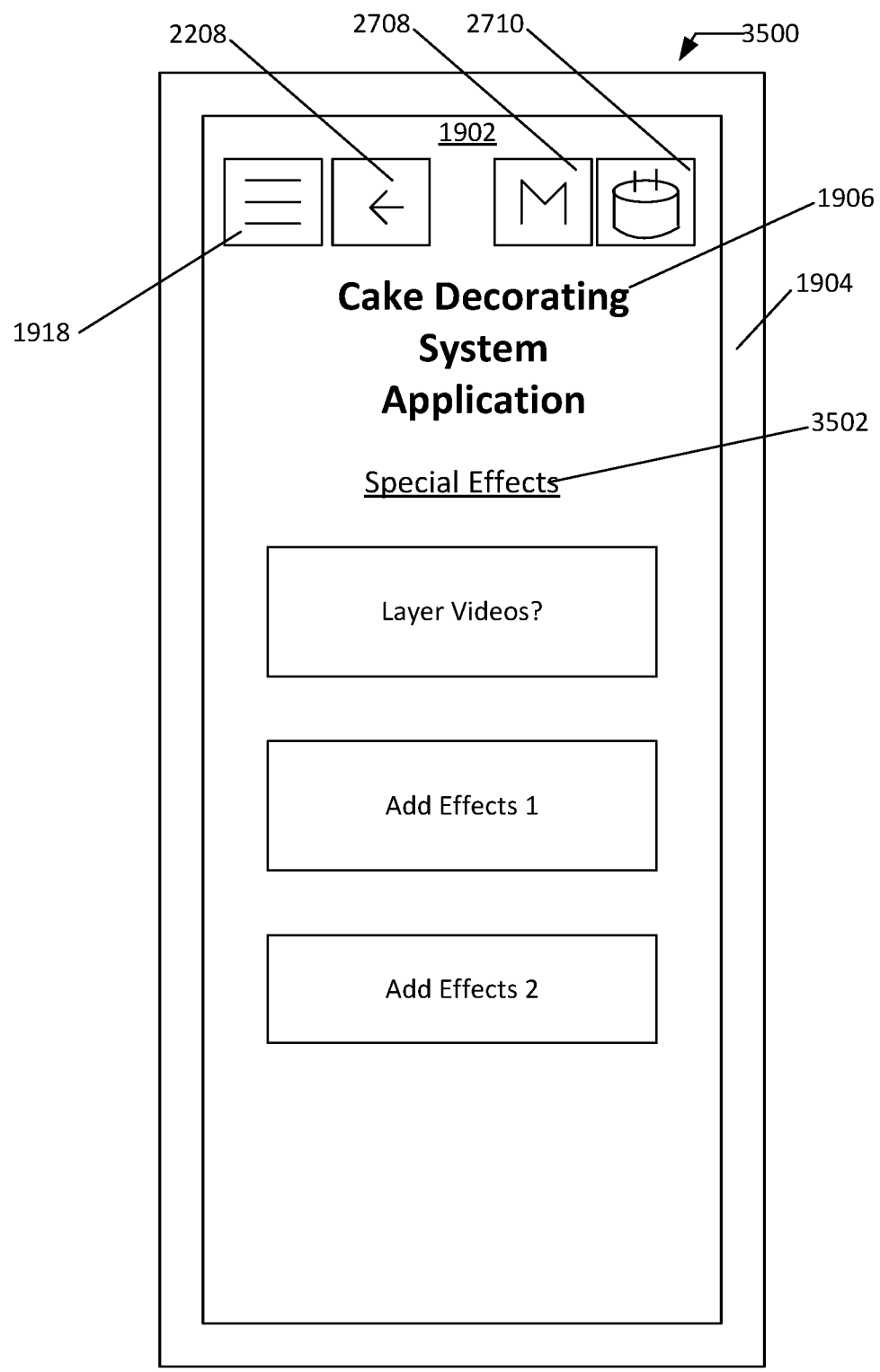
FIG. 35 is a diagram of a screen of a smart device that executes a CDS application that enables special effects to be added to content in the CDS in accordance with an example implementation.

In FIG. 35, a diagram 3500 of a screen 1902 of a smart device 1904 that executes a CDS application 1906 with a special effects interface 3502 that enables special effects to be added to content in the CDS in accordance with an example implementation. Videos may be layered, and predefined effects added, such as fading in, fading out, animations, ect. . . . . The interface 3502 may also have the dropdown menu 1918, back button 2208, main menu button 2708, and CDS device list button 2710.

Figure 36:
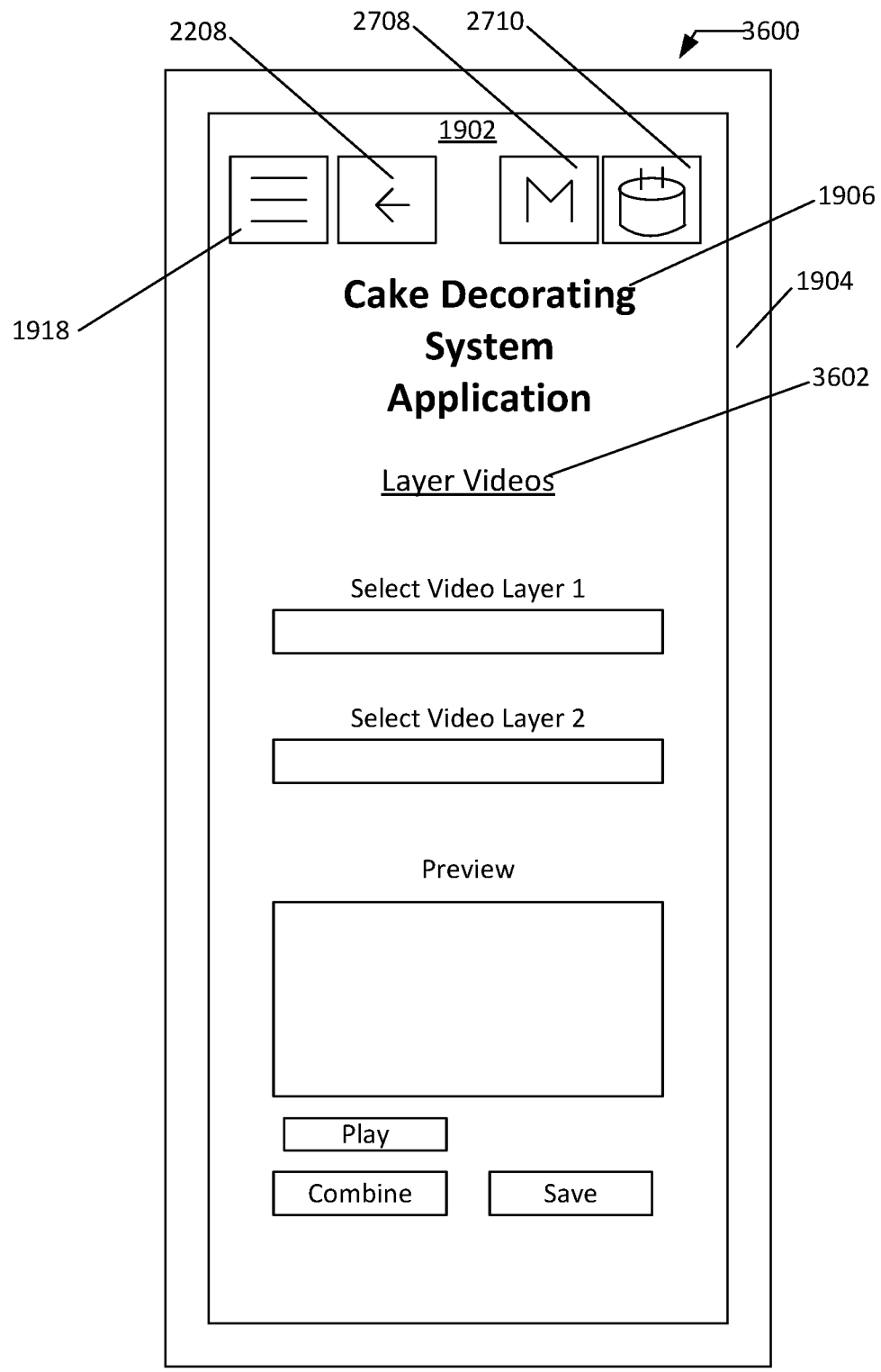
FIG. 36 is a diagram of a screen of a smart device that executes a CDS application that enables special effects of layering to be added to content in the CDS in accordance with an example implementation.

Turning to FIG. 36, a diagram 3600 of a screen 1902 of a smart device 1904 that executes a CDS application 1906 with a layer videos interface 3602 that enables special effects of layering to be added to content in the CDS in accordance with an example implementation. Videos to be layered may be selected and the layered videos combined and previewed. If the layering is acceptable, the layered video can be saved. The interface 3602 may also have the dropdown menu 1918, back button 2208, main menu button 2708, and CDS device list button 2710.

Figure 37:
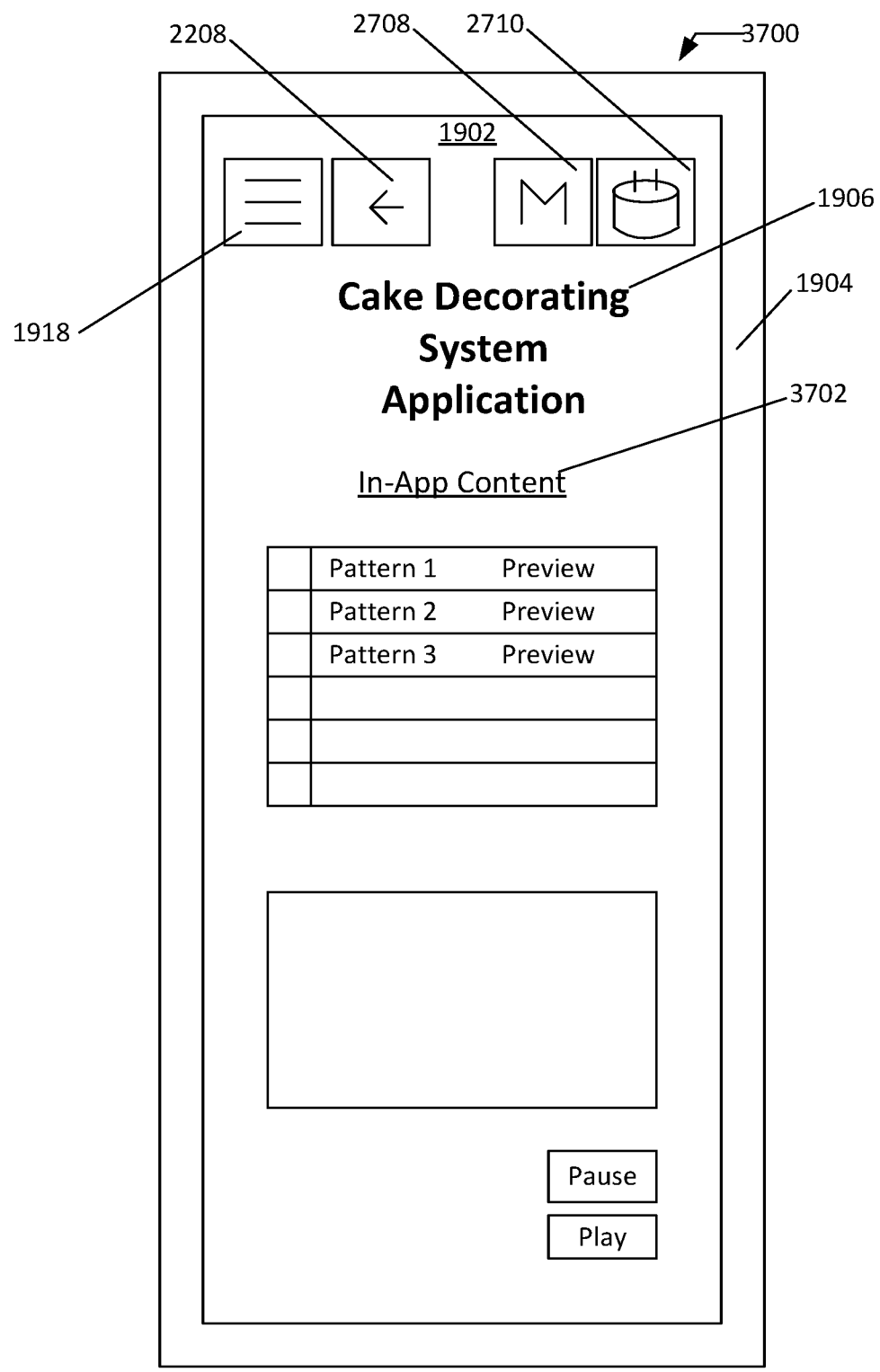
FIG. 37 is a diagram of a screen of a smart device that executes a CDS application that enables special effects of patterns to be added to content in the CDS in accordance with an example implementation.

In FIG. 37, a diagram 3700 of a screen 1902 of a smart device 1904 that executes a CDS application 1906 with an In-App Content interface 3702 that enables special effects, such as patterns to be added to content in the CDS in accordance with an example implementation. The interface 3702 may also have the dropdown menu 1918, back button 2208, main menu button 2708, and CDS device list button 2710.

Figures 38A, 38B:
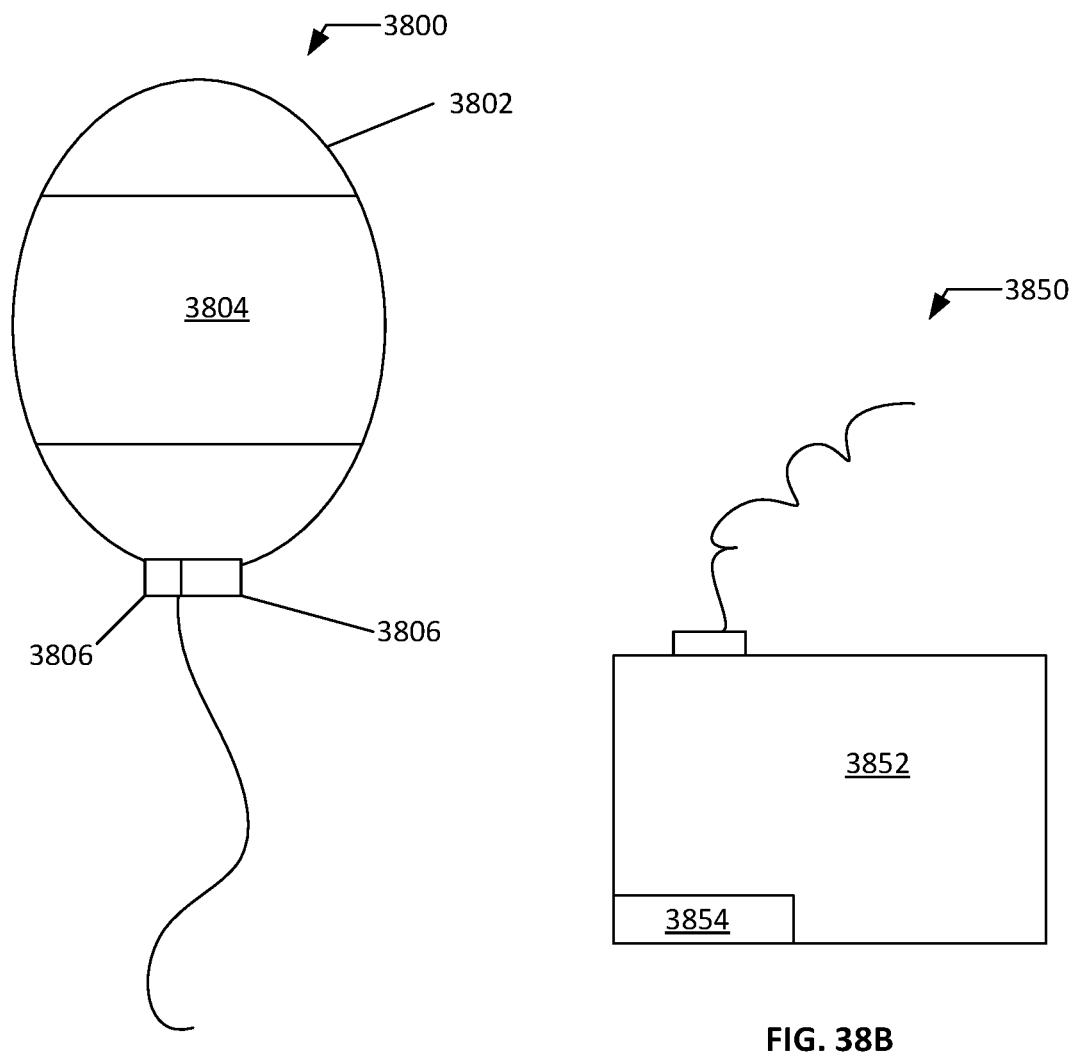
FIG. 38A is a diagram of a balloon with a flexible screen coupled to a power supply and controller that incorporates a transceiver in accordance with an example implementation.
FIG. 38B is a diagram of a scent generator having a controller with an integrated transceiver in accordance with an example implementation.

Turning to FIG. 38A, a diagram 3800 of a balloon 3802 with a flexible screen 3804 coupled to a power supply 3806 and controller 3806 that incorporates a transceiver is depicted in accordance with an example implementation. The balloon 3802 is an example of a CDS device and can be configured as other CDS devices. Flexible screen balloons that are "smart deco," i.e., interact with each other, CDS, in some implementations act as independent devices, and interact with a third-party system (e.g., iHoliday SmartDecco). In other implementations, the screen and controllers, sensors, and transceivers are affixed to a standard balloon making a standard balloon or another device a CDS device.

In FIG. 38B, a diagram 3850 of a scent generator 3852 having a controller 3854 with an integrated transceiver is depicted in accordance with an example implementation. The scent generator 3852 is another example of a CDS device and can be configured as other CDS devices. In other implementations, electronic devices such as toys, drones, interactive picture frames and other smart decco, smart clothing may be configured as CDS devices and included in a CDS "show." Just as screens may be placed on cakes and candles, CDS screens may be placed on plates and cutlery. The screens can be coordinate with pieces of cake or pie that have smaller screens affixed to them (e.g. on the top or side of a piece). Furthermore, cake camera(s) can be placed on cakes (similar to candle cameras) to capture the candle being blown out and other festivities.

Figure 39:
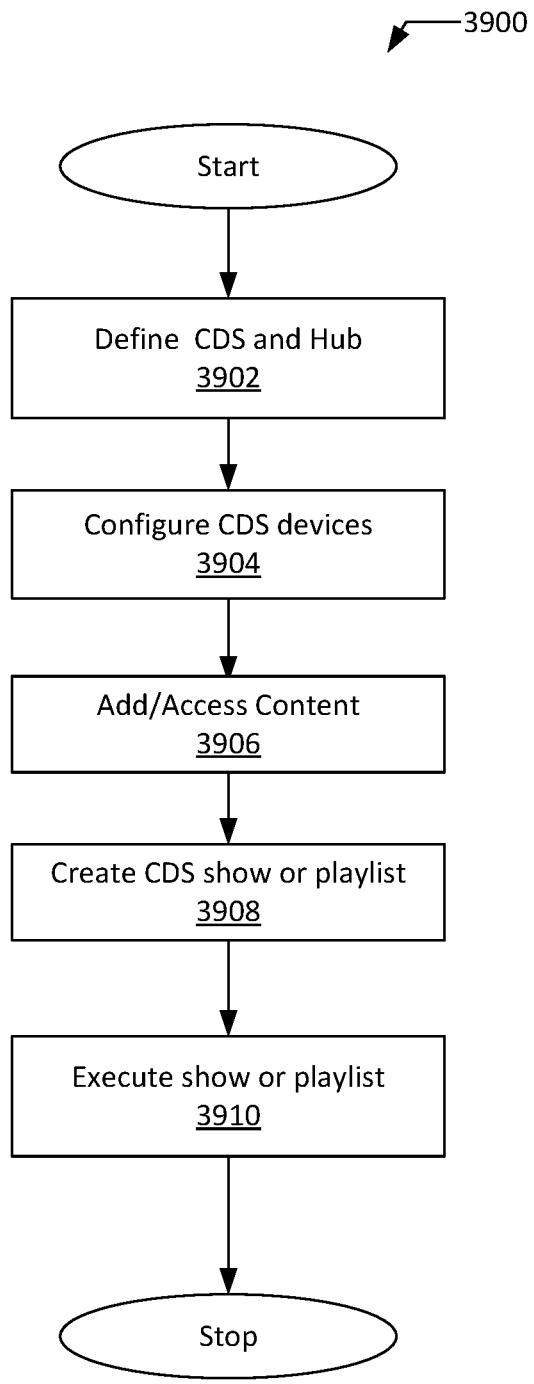
FIG. 39 is a flow diagram of a CDS configuration approach in accordance with an example implementation.

Turning to FIG. 39, a flow diagram of a CDS configuration approach is depicted in accordance with an example implementation. A CDS system and HUB are configured in step 3902. Devices that may be used in the CDS system are defined in step 3904. Content is added, such as video, music, and pictures in step 3906. A show or playlist is defined using the CDS HUB, CDS devices, and content in step 3908. The show or playlist is executed in step 3910. In some implementations, the defined elements CDS HUBS, CDS devices, and content are stored and accessed from the internet or "cloud" via a network.

It will be understood and is appreciated by persons skilled in the art, that one or more approaches, processes, sub-processes, or process steps described may be performed by hardware and/or software (machine-readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in a computer memory.

In preferred implementations of the invention the CDS can communicate and display content on one or more CDS displays in coordination with displays on other devices and/or other functions performed on other devices, such as smart phones, smart balloon devices, drones, interactive ornament devices, such as those as described in U.S. Pat. Nos. 7,248,230 and/or 8,462,079, interactive drumstick controllers, such as those described in U.S. Pat. Nos. 9,117,427 and/or 9,502,012, and wearable computer devices and digital name tag devices, such as name tags with proximity capacity. The text of each of the aforementioned United States Patents is included by reference in their respective entirety as though set forth in full.

In some embodiments of the invention the aforementioned smart balloon devices comprise balloons that comprise or have disposed on all or part of their surface a flexible digital display, one or more controller devices and a power supply capable of wirelessly receiving content for display on the aforementioned digital display.

In some preferred implementations of the invention the CDS is controlled by voice recognition means.

In some preferred implementations of the invention the show displayed on the CDS is displayed in coordination with content displayed on one or more smart devices and/or one or more virtual reality devices.

In some preferred embodiments of the invention the aforementioned coordination includes a summoning feature that enables users running an CDS app that enables notification of the commencement of a CDS show that the show has commenced or is about to commence. In some embodiments of the invention, this feature also provides to such users a graphical location of the cake or other item on which the CDS display(s) are currently located.

In some implementations of the invention content is provided to the CDS via one or more applications running on one or more smart devices as depicted in the remaining figures.

Figure 40A:
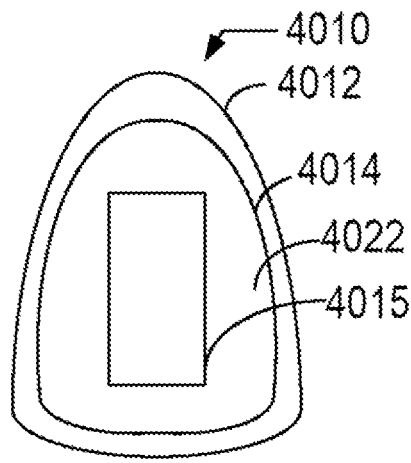
FIG. 40a-c is an exploded perspective view of the first embodiment of a Finger Computer Display and Controller Device ("FCDCD") according to the invention.
Figure 40B:
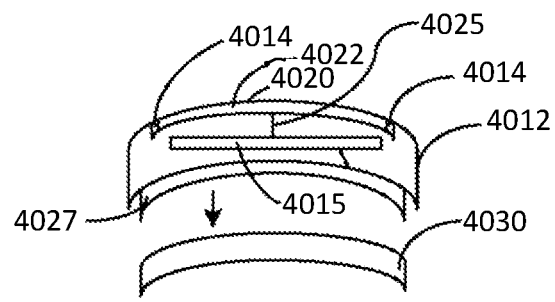
Figure 40C:
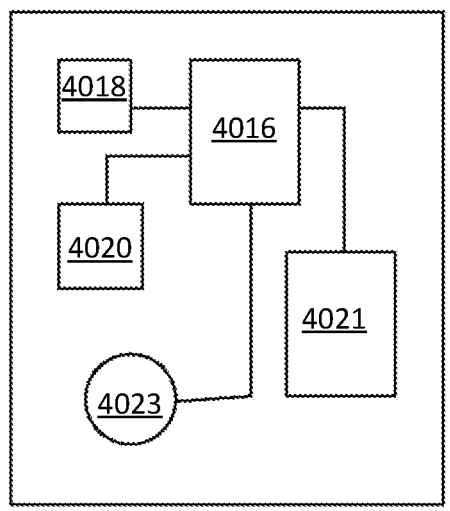
Figure 42:
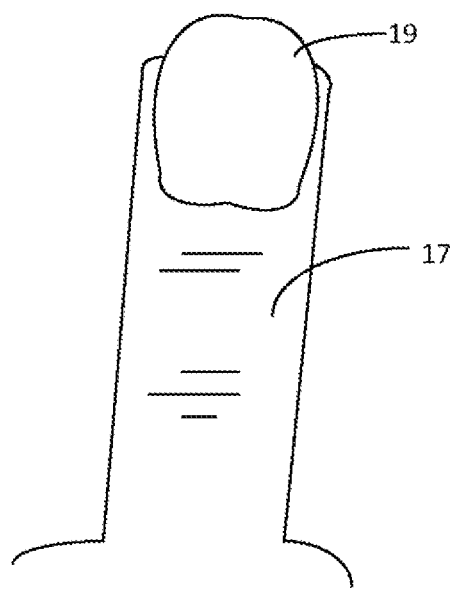
FIG. 42 is an illustration of a finger having a fingernail.

In FIG. 40a-c, exploded perspective view of a first embodiment of a Finger Computer Display and Controller Device ("FCDCD") according to the invention are depicted. The FCDCD 4010 includes a case 4012 in which is included a screen with an upper layer 4020, which in some embodiments is a flexible screen 4014 and controller 4015. The controller includes a processor 4016, a signal receiver 4018, a signal transmitter 4020, a digital content storage means (memory) 4021, and a battery 4023. The controller 4015 is coupled by a bus 4025 to screen 4022. Screen upper layer 4020 has defined therein display area 4022. In some embodiments other components commonly included in a telecommunications device may also be included in the case 4012, where the case 4012 forming an artificial nail 4030 in the current implementation. The artificial nail may be affixed with glue 4027 or other "sticky" type substance to a finger nail 4019 FIG. 42 on finger 4017 of FIG. 42 or toe nail.

Figure 41A:
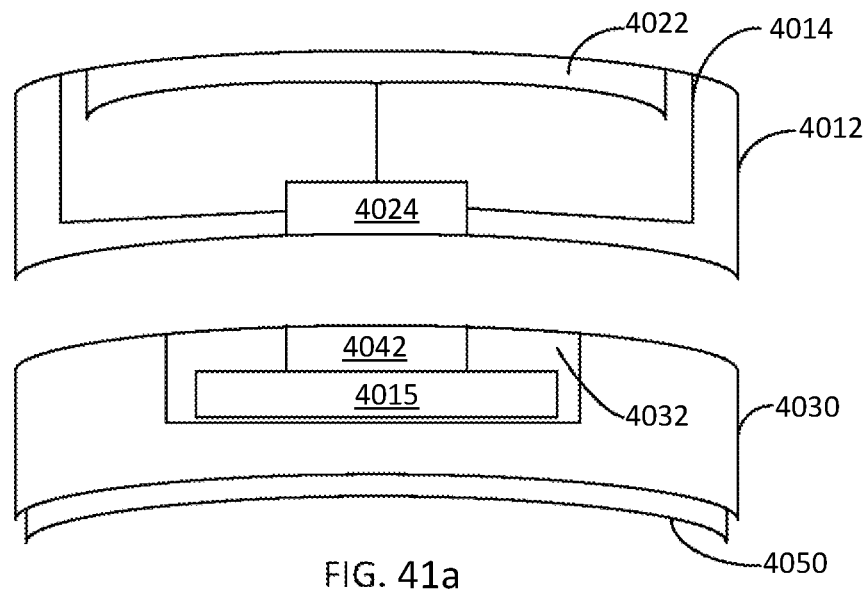
FIGS. 41a-b are cross-sectional and exploded view, respectively, of the embodiment of FIG. 40.
Figure 41B:
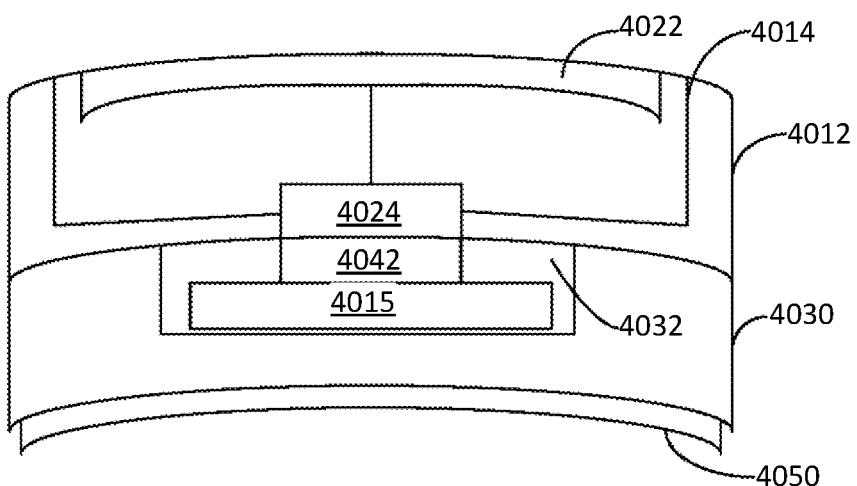

Turning to FIGS. 41a-b, a cross-sectional and exploded views, respectively of the embodiment of FIG. 40 are depicted. The processor contacts 4042 of processor 4016 in a lower artificial nail portion 4030 of artificial nail 4010 that has a case processor receptacle 4032 having controller 4015. The processor contracts 4042 communicates with screen contacts 4024 of screen 4014, enabling processor 4016 to control the operation of screen 4014 and to produce images in display area 4022 of screen upper layer 4020. In other implementations, bus 4025 may be implemented as contacts 4024. FIG. 41a-b also depicted with an adhesive layer 4050 that may be glue 4027 in the current implementation.

In some implementations the screen is a flexible screen (such as an OLED screen) and in some embodiments the screen or flexible screen is a touch screen. In yet other implementations the case is a flexible case and the components in the case are disposed to operate even with bending of the case reaches a 90-degree angle from center to ends of the case. In yet other implementations, the case may be a substance (such as epoxy) that covers the components to create a protective layer and may also secure the components to the display.

Content that may be stored in, and displayed or played on the FCDCD include, without limitation, visual content, audio content, audiovisual content, text, graphics and/or haptic content.

In some implementations, the case is affixed to an artificial nail. In some implementations the bottom of the case is the artificial nail. Artificial nail 4030 can be produced by any of a wide variety of processes known to those skilled in the art, including, without limitation, a variation of methods described in U.S. Pat. No. 7,677,257 and the references cited therein, all of which are incorporated herein by reference. In some implementations, processor 16 is secured within the case processor receptacle 4032 defined within the case. In other implementations the processor receptacle 4032 is defined within an artificial nail 4030. In yet other implementations, artificial nail processor receptacle 4032 is defined by removing overlying portions of artificial nail 4030 after artificial nail 4030 is produced. In other implementations, artificial nail processor receptacle 4032 is produced by a molding process used to produce artificial nail 4030. In still other specific embodiments, processor 16 is incorporated into artificial nail 30 during the process of producing artificial nail 4030, e.g., inserted into a mold into which the material used to form artificial nail 4030 is subsequently introduced. In yet other implementations, processor 4016 is secured to an upper surface 34 of artificial nail 4030, and engages with a screen processor receptacle (not shown) defined within screen upper layer 4020. Other methods for incorporating processor 4016 between flexible screen upper layer 4020 and artificial nail 4030 of implementations of finger computer, display and controller devices according to the invention will be obvious to skilled artisans.

In some embodiments, screen upper layer 4020 is a flexible screen comprising an OLED screen, such as that produced by SAMSUNG™. Other flexible screens can also be employed. In some embodiments the flexible screen, such as a touch screen capable of transmitting control information to the processor in response to a user's touch and/or tactile interaction with the touch screen. Flexible screen upper layer 4020 is formed from the selected flexible screen into a shape generally corresponding to the shape of a nail or an artificial nail 4030 or the general with-wise curve of a nail or artificial nail perpendicular to the length of the finger on which the nail or artificial nail is attached, and is secured to upper surface 4034 of the nail or artificial nail 4030 by one or more appropriate adhesives, mechanical fasteners or other means known to skilled artisans. In some embodiments the flexible screen is a part of a flexible casing which contains the processor, transmitter, receiver, battery and memory components which are disposed within the flexible casing and oriented in relation to each other such that when the case is flexed up to 90-degrees, ends to center, that the components will function properly. In some embodiments other components commonly found in telecommunications devices such as smart phones are similarly oriented in relation to each other such that when the case is flexed up to 90-degrees, ends to center, that the components will function properly.

In some implementations where a flexible screen and a flexible case are used, the case is configured to allow the case to slide. Processor 4016 is encoded with appropriate software drivers for controlling the function of screen upper layer 4020 to produce images in display area 4022 of flexible screen upper layer 4020. The images in some implementations may be images of JPEG or other known digital image formats. In yet other implementations, the image may be compressed prior to loading into the FCDCD. In some implementations, processor 4016 further comprises transmitter 4020 and receiver 4018 elements (in other implementations the transmitter and receiver maybe combined into a single transceiver) which enables processor 4016 to communicate with an external source, such as a wireless-enabled computer, a smartphone or other telecommunication device, or in specific embodiments, other adjacent finger computer, display and controller devices, in order to receive activation or deactivation instructions, instructions for the production of one or more images in display area 4022, coordination instructions between or among adjacent finger computer, display and controller devices, etc. The transmitter 4020 and receiver 4018 may be implemented to communicate using a known approach, such as wireless, infrared, light sensing/transmitting diodes, three wire bus or other bus structure. In some embodiments activation/deactivation of finger computer display and controller device is accomplished, by means of an included power switch 4046. In some embodiments, where the display comprises a touch screen, such activation/deactivation is controlled by a haptic means by user's engagement of virtual switch displayed on the touch screen display.

In specific embodiments, processor 4016 is also provided with nano-gyroscope 4048, which provides motion and orientation information to processor 4016 for use with various applications requiring such information, similarly to "WII®"-type devices.

FCDCD 4010 is secured to a user's fingernail 4019 by any known means, such as adhesive layer 4050.

Figure 43:
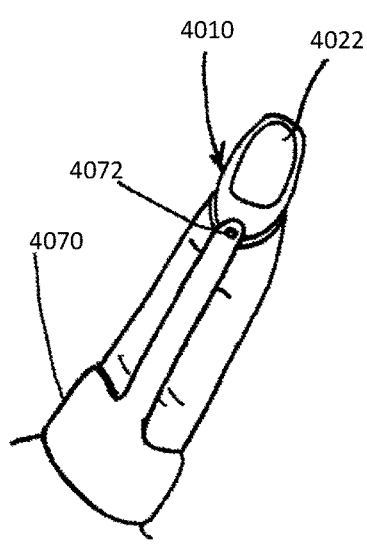
FIGS. 43 and 44 are illustrations of embodiments of the finger computer, display and controller devices according to the invention in communication with electricity generating devices that employ a user's body heat.
Figure 44:
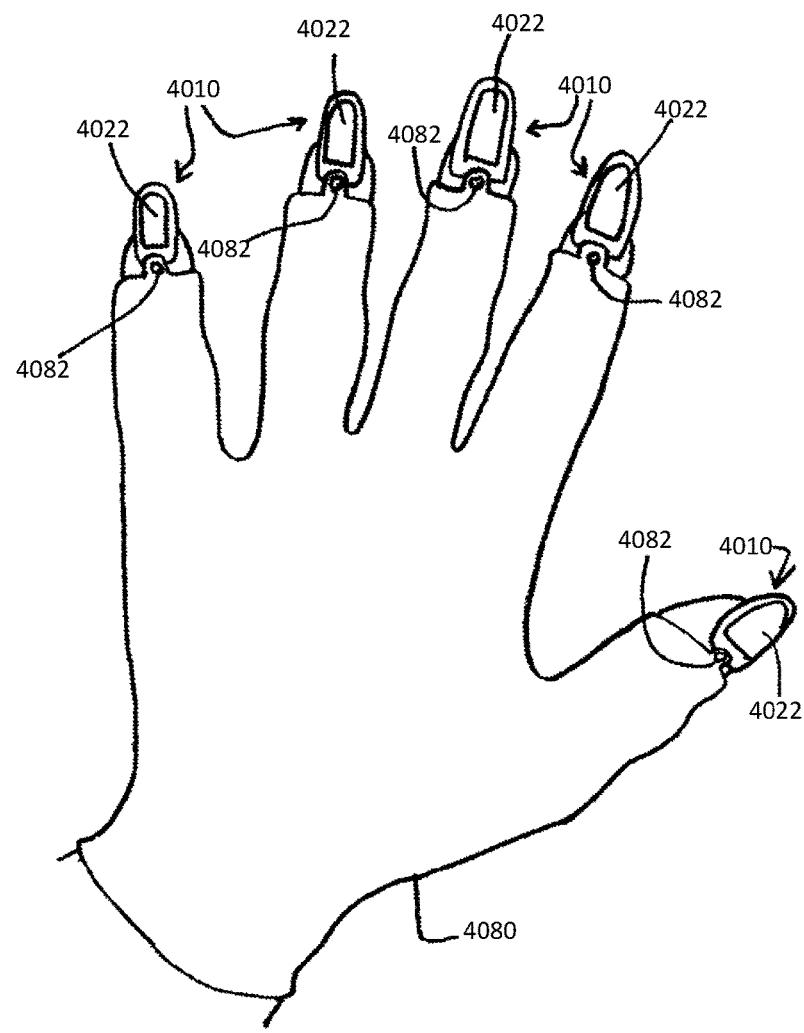

FCDCD 4010 is powered, in certain implementations, by appropriately-sized batteries. In other particular embodiments, FCDCD 4010 is powered by RF inductor technology 4060, in a manner similar to "smart cards"; such embodiments function best in environments having a continuous supply of appropriate RF signals. In still other embodiments, electricity generated from a thermoelectric material such as Power Felt in contact with a user's body provides sufficient current to operate the FCDCD 4010. Depending on the efficiency of the thermoelectric material and the current requirements of FCDCD 4010, the power supply for FCDCD 4010 can take the form of, for example in FIG. 43, a power band of thermoelectric material 4070 positioned around a user's finger and in communication with FCDCD 4010 via contact 4072 and appropriate conductors and electronic components regulating current flow, or alternatively, a power glove 4080 shown in FIG. 44 which provides electricity to a plurality of finger computer, display and controller devices 4010 via contacts 4082 etc. In some implementations, the FCDCD is powered by one or more solar cells disposed on the top of the unit in communication with the battery.

In particular implementations, FCDCD 4010 is configured with a touchscreen. Such implementations enable a wearer the ability to control by touch, in manners well known to those skilled in the art, various functions of processor 4016 or of external processors and/or other devices with which processor 4016 are in hard or wireless contact.

Some implementations of the FCDCD have been described above in which processor 4016 is incorporated into artificial nail 4030. In an alternative implementation shown in FIG. 45 processor, 4016 is remote from artificial nail 4030 and wirelessly communicates with flexible screen upper layer 4020 via transmitter/receiver element 4090. Processor 16 can be disposed in any desired location, such as, without limitation, a computer, a telecommunication device, a musical instrument, a game controller, a television set, etc. Other communication between processor 4016 and flexible upper layer 4020, such as a wire or other appropriate circuitry, can also be employed.

Figure 45:
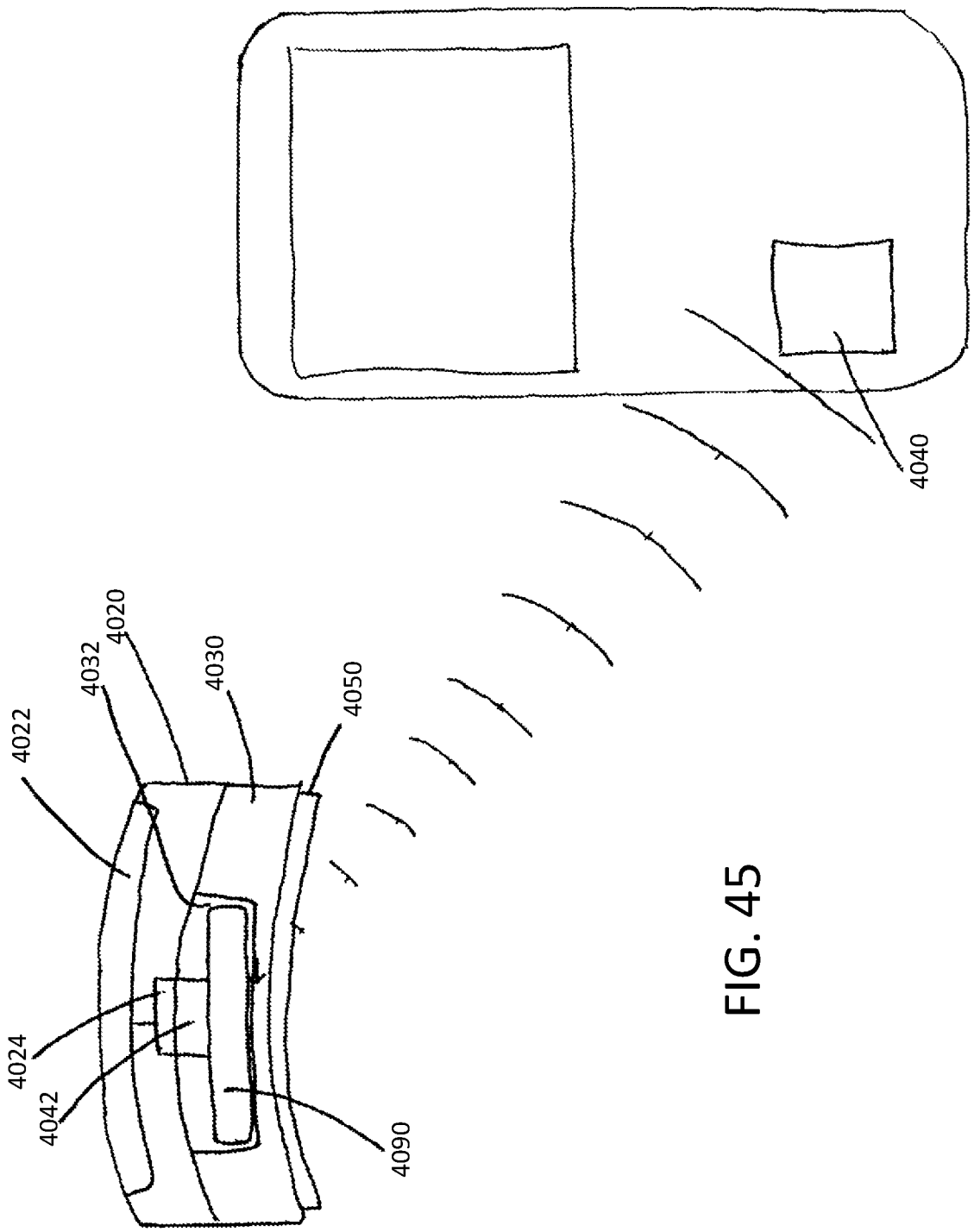
FIG. 45 illustrates an alternative embodiment in which the processor is disposed remotely from the FCDCD rather than being secured within the artificial nail.

Turning to FIGS. 46a-d, illustrations of an alternative embodiment in which the alternate embodiment of FIG. 45 is in a thimble-like finger cap 4096 are depicted in accordance with an example implementation. In FIG. 46a, a thimble-like finger cap 4096 top view is depicted as forming a case 4097 having a screen 4014, controller 4015, and contacts/bus 4025. FIG. 46b is a front view of thimble-like finger cap 4096. FIG. 46c is a back view of thimble-like finger cap 4096. FIG. 46d is cut away side view of the thimble-like finger cap 4096.

In some implementations individual FCDCDs of a plurality of FCDCDs worn by a use provide discrete or unique identification information regarding the specific FCDCD to an external processor, such as one in or associated with a user's telecommunication device, such as an iPhone or other "smartphone", or a user's computer or similar device. In this way specific content, programming, etc. can be routed by a processor in a hub or other remote processor to a specific FCDCD. In some embodiments, the user's telecommunication device and/or computer can "pair" with the individual FCDCDs (such as with BLUETOOTH™) so that they can be individually controlled or have specified content sent to them by or through an external device such as a user's telecommunication device or computer.

In some implementations, the individual FCDCDs communicate with each other to produce coordinated displays. In some implementations, the FCDCDs can function as switches or other controllers that remotely control external devices by wireless means. For example, in some implementations, such as where the FCDCDs comprise a touch screen and are configured with an application that enables a user to send on/off control signals wirelessly from the FCDCDs to a receiver/control signal relay device in communication with an external device whereby such on/off control signal is provided to the external device to switch such device, or a function associated with such device, on and off. In other implementations, the FCDCDs can control one or more external devices that in turn trigger and/or control one or more sound or signal generating devices, sound or signal modifying devices, synthesizers, light controllers, special effects controllers, or a feature or functionality of a "Collaborative Show Performance System" as that term is used in U.S. patent application Ser. No. 13/815,824, entitled Composition Production With Audience Participation and is incorporated herein by reference.

In some implementations, individual FCDCDs provide locational information regarding their location to a heads-up display, such as Google Glasses, for controlling a processor in coordination with information displayed on the heads-up display. In this way, for example, if the display of an augmented reality heads up display has a selectable button displayed on it, the user's movement of the finger on which is disposed a FCDCD to a place in the user's visual field displayed via the heads up display where such button is projected, coupled with the engagement of an activation function, such as tapping on the touch screen of the finger computer, display, and controller device, will "click" on the button displayed and select and/or engage the function selected by or engaged by the clicking of the button.

In some implementations, such control signal or signals may be provided by one or more FCDCDs using wireless transmissions involving separate and discreet radio frequencies for each of the FCDCDs. In some embodiments, to conserve battery life in the finger computer, display and controller devices, wireless signals from one or more finger computer, display and controller devices are sent to and received by a hub signal relay device that, in turn, provides control signal information to one or more external devices. In other implementations, the hub includes a receiver, a transmitter, a processor whereby the control signal is received processed and transmitted by the Hub to one or more external receivers in communication with one or more external devices. In some embodiments, the hub is worn by the user.

Content to be displayed on the FCDCD can be provided from any number of sources that can be in wireless communication with the FCDCD, such as from a telecommunications device, a remote server, or any other device or system capable of transmitting visual, audio, audiovisual, graphic, textual, and/or haptic content wirelessly.

In other implementations, the finger computer, display, and controller devices are configured to include one or more sound inputting devices, such as microphones and/or one or more sound generating devices. In this way sound content provided to the finger computer, display and controller devices from an external or internal source can be played on the FCDCD. Similarly, the sound captured by one or more FCDCDs can be transmitted by the FCDCDs to an external device, such as a telecommunications device, such as the user's smartphone, or another type of computer.

In some implementations, the FCDCDs are configured to include one or more haptic inputting devices. In this way, haptic data provided to an FCDCD, such as from gestures, tactile contact with the device, etc., can be captured and used by the device and/or be transmitted by the device to an external device, such as to a telecommunications device, such as the user's smartphone, or another type of computer, or to an external device to be controlled by such haptic data. In some embodiments, the FCDCD is configured to include one or more haptic outputting devices, such as one or more vibrators, heat generators, etc., in order to output haptic information data sent to the FCDCD.

It will be understood and is appreciated by persons skilled in the art, that one or more processes, sub-processes, or process steps described in connection with the figures may be performed by hardware and/or software (machine-readable instructions) that configures generic hardware to perform a specific function. If the approach is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital forms such as digital circuitry or source code or in analog forms such as analog circuitry or an analog source such an analog electrical, sound or video signal), and may selectively be embodied in any computer-readable medium for use by or in connection with an instruction execution system, apparatus, or device, such as a computer-based system, processor containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for a CDS has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A decoration, comprising:
   a first base with a controller;
   a power connector adapted to couple with a power source and a termination point;
   a support member supported by the first base;
   a receiver that receives a wireless signal that contains the show signal coupled to the controller;
   a light emitting element supported by the support member and coupled to the controller and power connector, wherein the termination point is adapted to couple with an at least a second base and the controller responding to a show signal received from the termination point where the show signal is saved in memory at the controller; and a finger controller interacts with the show signal via the receiver.

2. The decoration of claim 1, includes an adhesive to hold the finger controller on a finger.

3. The decoration of claim 2, wherein the termination point is coupled to a bus that carries electrical power from the power source.

4. The of claim 2, wherein the termination point receives at least one data signal.

5. The of claim 4, wherein the termination point also receives electrical power from the power source.

6. The decoration of claim 4, wherein the termination point is a wireless termination point.

7. The decoration of claim 2, wherein the light emitting element is a display capable of displaying graphical images.

8. The decoration of claim 2, wherein the light emitting element is a display capable of displaying video images.

9. The decoration of claim 2, wherein the light emitting element is an light emitting diode.

10. The decoration of claim 2, wherein the support member is wax with a wick that when lite, results in a signal being received at the controller.

11. The decoration of claim 10, where a sensor generates the signal.

12. The decoration of claim 2 further comprising, the receiver that receives coupled to the controller that receives the show signal, where the show signal when activated results in the controller activating the light emitting element in response to the show signal.

13. The decoration of claim 12, where the receiver is part of a transceiver.

14. The decoration of claim 2, further includes a speaker coupled to the controller.

15. The decoration of claim 2, where the show signal contains audio and visual data.

16. The decoration of claim 2, where the power connector connects to the power source located in the first base.

17. The decoration of claim 2, where the power connector connects to the power source located in the support member.

18. The decoration of claim 2, where the power connector connects to the power source located external to the holiday decoration.

19. The decoration of claim 2, where the first base is a power hub having more than one power connectors that are adapted to supply power to at least the second base.

\* \* \* \* \*